United States Patent
Agiwal et al.

(10) Patent No.: US 10,320,915 B2
(45) Date of Patent: Jun. 11, 2019

(54) SYSTEM AND METHOD FOR IP SESSION CONTINUITY IN DEVICE-TO-DEVICE COMMUNICATION SYSTEM

(71) Applicant: Samsung Electronics Co., Ltd., Suwon-si, Gyeonggi-do (KR)

(72) Inventors: Anil Agiwal, Bangalore (IN); Young-Bin Chang, Anyang-si (KR); Ki-Suk Kweon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/277,408

(22) Filed: May 14, 2014

(65) Prior Publication Data

US 2014/0341112 A1 Nov. 20, 2014

(30) Foreign Application Priority Data

May 14, 2013 (IN) ............................ 2125/CHE/2013

(51) Int. Cl.
*H04L 29/08* (2006.01)
*H04W 36/00* (2009.01)
(Continued)

(52) U.S. Cl.
CPC .......... *H04L 67/14* (2013.01); *H04L 61/2007* (2013.01); *H04W 36/0011* (2013.01);
(Continued)

(58) Field of Classification Search
CPC ... H04L 67/14; H04W 36/0011; H04W 76/04; H04W 8/26
(Continued)

(56) References Cited

U.S. PATENT DOCUMENTS 9,414,343 B2 8/2016 Park et al.
2005/0232212 A1 10/2005 Kang et al.
(Continued)

FOREIGN PATENT DOCUMENTS

CN 102422703 A 4/2012
KR 1020100049237 A 5/2010
(Continued)

OTHER PUBLICATIONS

3GPP 3rd Generation Partnership Project;Technical Specification Group SA; Feasibility Study for Proximity Services (ProSe) (Release 12), 3GPP TR 22.803 V2.0.0; Nov. 30, 2012.
(Continued)

*Primary Examiner* — Kwang B Yao
*Assistant Examiner* — Syed M Bokhari
(74) *Attorney, Agent, or Firm* — Jefferson IP Law, LLP

(57) ABSTRACT

A method for performing, by a User Equipment (UE), Device-to-Device (D2D) communication using a wireless communication network is provided. The method includes performing D2D communication via a direct communication path using an allocated Internet Protocol (IP) address, establishing a first Evolved Packet System (EPS) bearer supporting D2D communication via the wireless communication network, to a Packet Data Network (PDN) Gateway (P-GW), determining to switch from the direct communication path to D2D communication via the wireless communication network, and communicating an IP packet through the first EPS bearer based on the determination. An IP packet transmitted through the first EPS bearer may not be transmitted to a packet data network, or an IP packet received through the first EPS bearer is not received from the packet data network.

24 Claims, 24 Drawing Sheets

(51) Int. Cl.
  *H04L 29/12* (2006.01)
  *H04W 76/23* (2018.01)
  *H04W 8/26* (2009.01)
  *H04W 76/14* (2018.01)

(52) U.S. Cl.
  CPC ......... *H04W 76/23* (2018.02); *H04L 61/2514* (2013.01); *H04W 8/26* (2013.01); *H04W 36/03* (2018.08); *H04W 76/14* (2018.02)

(58) Field of Classification Search
  USPC ........................................ 370/328, 338, 329
  See application file for complete search history.

(56) References Cited

U.S. PATENT DOCUMENTS

| | | | |
|---|---|---|---|
| 2010/0210238 A1 | 8/2010 | Cho et al. | |
| 2011/0294474 A1* | 12/2011 | Barany | H04W 8/005 |
| | | | 455/414.1 |
| 2012/0020213 A1 | 1/2012 | Horneman et al. | |
| 2012/0207100 A1* | 8/2012 | Hakola | H04W 76/14 |
| | | | 370/329 |
| 2013/0182607 A1* | 7/2013 | Kim | H04W 28/0215 |
| | | | 370/254 |
| 2013/0223399 A1* | 8/2013 | Lu | H04W 76/023 |
| | | | 370/329 |
| 2013/0244661 A1* | 9/2013 | Lin | H04W 76/14 |
| | | | 455/436 |
| 2013/0288668 A1* | 10/2013 | Pragada | H04W 12/06 |
| | | | 455/426.1 |
| 2014/0036769 A1* | 2/2014 | Stojanovski | H04W 4/70 |
| | | | 370/328 |
| 2014/0092885 A1* | 4/2014 | Venkatachalam | H04W 76/14 |
| | | | 370/338 |
| 2014/0112332 A1 | 4/2014 | Park et al. | |
| 2014/0171026 A1* | 6/2014 | Jackson | H04W 12/06 |
| | | | 455/411 |
| 2014/0219198 A1* | 8/2014 | Chiu | H04W 76/20 |
| | | | 370/329 |
| 2014/0328267 A1 | 11/2014 | Ryu et al. | |
| 2017/0094561 A1 | 3/2017 | Horneman et al. | |

FOREIGN PATENT DOCUMENTS

| | | |
|---|---|---|
| KR | 1020140051579 A | 5/2014 |
| KR | 10-2014-0129737 A | 11/2014 |
| KR | 10-2014-0131761 A | 11/2014 |
| WO | 2012061993 A1 | 5/2012 |

OTHER PUBLICATIONS

Chinese Office Action dated Sep. 20, 2018; Application #. 201480027854.7.

* cited by examiner

SYSTEM AND METHOD FOR IP SESSION CONTINUITY IN DEVICE-TO-DEVICE COMMUNICATION SYSTEM

CROSS-REFERENCE TO RELATED APPLICATION(S)

This application claims the benefit under 35 U.S.C. § 119(a) of an Indian patent application filed on May 14, 2013 in the Indian Property Office and assigned Serial number 2125/CHE/2013, the entire disclosure of which is hereby incorporated by reference.

TECHNICAL FIELD

The present disclosure relates to a method for supporting Internet Protocol (IP) session continuity in a Device-to-Device (D2D) communication system, and a system therefor.

BACKGROUND

Each of User Equipments (UEs) UE1 and UE2, which have been attached to (or have subscribed to) a wireless communication network, may be assigned an IP address by the wireless communication network. The IP address may be assigned by a Packet Data Network (PDN) Gateway (P-GW), an IP server or some other network nodes in the wireless communication network. These IP addresses are local IP addresses in the wireless communication network.

FIG. 1 illustrates communication paths between UEs according to the related art.

Referring to FIG. 1, a UE1 100 and a UE2 102 may communicate with each other via the wireless communication network. In the wireless communication network, as for IP packets between the UE1 100 and the UE2 102, there may be a path 120 in which the IP packets may traverse via various network nodes. Examples of the network nodes may include evolved Node B (eNB) 112, eNB 122, Serving Gateway (S-GW) 114, S-GW 124, P-GW 116, and P-GW 126, a Packet Data Network (PDN) 110, and the like.

In communication between the UE1 100 and the UE2 102 via the wireless communication network, the UE1 100 and the UE2 102 may establish IP connections to some servers of the PDN 110. In the PDN 110, IP packets may be transmitted from the UE1 100 to the server of the PDN 110, and the server may transmit the IP packets to the UE2 102. Similarly, IP packets may be transmitted from the UE2 102 to the server of the PDN 110, and the server may transmit the IP packets to the UE1 100.

Packet bearers may be established between the UE1 100 and UE2 102 and the P-GW 116 and P-GW 126 to deliver IP packets from the UE1 100 and UE2 102 to the PDN 110. Typically, if a UE attaches with the wireless communication network, a default Evolved Packet System (EPS) bearer may be established between the UE and the P-GW. An EPS bearer between the UE1 100 and the P-GW 116 is a logical bearer, and may constitute a radio bearer between the UE1 100 and the eNB 112, an S1 bearer between the eNB 112 and the S-GW 114, and an S5 bearer between the S-GW 114 and the P-GW 116. When needed to provide differential Quality of Service (QoS) treatments to various IP flows of a UE, additional EPS bearers may be established between the UE and the P-GW of the PDN. The EPS bearer may be unidirectional or bidirectional. EPS bearers may also be established between the UE and P-GWs of multiple PDNs (e.g., Internet PDN, IP Multimedia Subsystem (IMS) PDN, and the like).

In the wireless communication network, if the P-GW 116 receives an Uplink (UL) IP packet on the EPS bearer, the P-GW 116 may convert a source IP address of the UE1 100 into a public IP address of a UE, and transmit the modified IP packet to the PDN 110. The P-GW 116 may have a mapping table (e.g., a packet filter table) between local IP addresses and public IP addresses for conversion of a source IP address in the UL direction.

The P-GW 116 may be designed to transmit UL IP packets received on the EPS bearer to the PDN 110. A destination IP address included in the UL IP packets received on the EPS bearer may not be modified by the P-GW 116. It is expected that because the UE1 100 is a source of the IP packet, the UE1 100 may have a public address of the destination and the public address of the destination may be filled in the IP packet.

In a Downlink (DL) direction, the P-GW 116 may receive IP packets from the PDN 110. The received IP packets may be mapped to appropriate EPS bearers in the DL direction based on DL traffic filters. The DL traffic filters may include a source IP address, a destination IP address, a source port number, destination IP addresses, a protocol type, and the like.

Alternatively, the UE1 100 and the UE2 102 may communicate with each other over a direct communication path 130. The direct communication path 130 between the UE1 100 and the UE2 102 may be established if the UE1 100 and the UE2 102 are in proximity to each other. The direct communication may be performed by a communication technique, for example, Wireless Fidelity (WiFi), Bluetooth, Zigbee, and/or the like. For direct communication, the UE1 100 and the UE2 102 may use the IP addresses, which have been assigned to the UE1 100 and the UE2 102 by the network (e.g., P-GWs 116 and 126, or IP server).

FIGS. 2A and 2B illustrate an IP packet structure and a protocol stack for direct communication between UEs according to the related art.

Referring to FIG. 2A, during the direction communication, an application layer 212 of the UE1 100 and an application layer 222 of the UE2 102 may interact with each other. Similarly, transport layer 214 of the UE1 100 and transport layer 224 of the UE2 102, IP layer 216 of the UE1 100, IP layer 226 of the UE2 102, wireless/wireline protocol stack layer 218 of the UE1 100, and wireless/wireline protocol stack layer 228 the UE2 102 may interact with each other. An example of the wireless protocol stack layer may include 3GPP-based wireless protocols, a WiFi protocol, and/or the like.

As illustrated in FIG. 2B, the UE1 100 and the UE2 102 may exchange IP addresses of each other, and transmit IP packet 200 and IP packet 202 carrying the IP addresses of each other. The IP packet 200 heading from the UE1 100 to the UE2 102 may have an IP address IP1 of the UE1 100 as a source IP address, and an IP address IP2 of the UE2 102 as a destination IP address. The IP packet 202 heading from the UE2 102 to the UE1 100 may have an IP address IP2 of the UE2 102 as a source IP address, and an IP address IP1 of the UE1 100 as a destination IP address.

Due to the change in channel conditions and the mobility of UEs, direct communication between the UEs is not feasible. If the direct communication path becomes weak and communication using the direct communication path is no longer feasible, the UE1 100 and the UE2 102 may be switched to a communication path via the wireless communication network. During the direct communication, the UE1 100 and the UE2 102 may transmit, to each other, IP packets carrying local IP addresses assigned by the wireless communication network. After the communication path is switched to the communication path via the wireless communication network, the UE1 100 and the UE2 102 may continue to transmit, to each other, IP packets carrying the local IP addresses assigned by the network. For example, the UE1 100 may continue to transmit an IP packet to the UE2 102. In this case, the IP packet may include a source IP address which is an IP address of the UE1 100, and a destination IP address which is an IP address of the UE2 102. These IP addresses are local IP address assigned by the network.

FIG. 3 illustrates a P-GW operation after communication path switching according to the related art.

Referring to FIG. 3, during the communication of the UE1 100 via the wireless communication network, if the P-GW 116 receives a UL IP packet 300 on an EPS bearer 118, the P-GW 116 may convert the source IP address of the UE1 100 into a public IP address of the UE1 100, in the UL IP packet 300, and transmit the modified IP packet 310 to the PDN 110. The modified IP packet 310 carrying the local IP address of the destination UE may not reach the destination UE as the local IP address of the destination UE is not a valid IP address in the PDN 110. The same problem may happen even for the IP packets transmitted by the destination UE to the UE1 100.

In one of the possible solutions when the path is switched from the direct communication path to the communication path via the wireless communication network, an application of the UE1 100 may establish a new IP connection to some servers of the PDN 110, and the UE1 100 may start communication with other UEs. However, such a solution does not provide seamless IP session continuity.

Alternatively, a new IP connection may be established between the UE1 100 and some servers of the PDN 110, and the new IP connection may tunnel the IP packets from the UE1 100 to another UE. A new IP connection may be established between another UE and the server of the PDN 110, and the new IP connection may tunnel the IP packets from another UE to the UE1 100. However, such a solution may require changes at the IP layer, and the IP layer needs to be aware of communication path switching. In addition, the IP layer may have more tunneling overhead.

Therefore, there is a need for a system and method for providing seamless IP session continuity when a communication path for a UE1 and another UE switches from the direct communication path to the communication path via the wireless communication network, or vice versa.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and system for providing seamless Internet Protocol (IP) session continuity when a communication path between User Equipments (UEs) switches from a direct communication path to a communication path via a wireless communication network, or vice versa.

Another aspect of the present disclosure is to provide a method and system for providing communication between UEs via a wireless communication network, and allowing an application layer, a transport layer and an IP layer of each of the UEs to directly communicate with each other.

Another aspect of the present disclosure is to provide a Proximity-based Service (ProSe) Evolved Packet System (EPS) bearer creation/activation procedure.

Another aspect of the present disclosure is to provide a Packet Data Network (PDN) Gateway (P-GW) operation performed in IP packets that are received from a UE on a UL ProSe EPS bearer.

In accordance with an aspect of the present disclosure, a method for performing, by a UE, Device-to-Device (D2D) communication using a wireless communication network is provided. The method includes performing D2D communication via a direct communication path using an allocated IP address, establishing a first Evolved Packet System (EPS) bearer supporting D2D communication via the wireless communication network, to a P-GW, determining to switch from the direct communication path to D2D communication via the wireless communication network, and communicating an IP packet through the first EPS bearer based on the determination. An IP packet transmitted through the first EPS bearer may not be transmitted to a packet data network, or an IP packet received through the first EPS bearer is not received from the packet data network.

In accordance with another aspect of the present disclosure, a method for supporting, by a P-GW, D2D communication using a wireless communication network is provided. The method includes establishing a first EP bearer and a second EPS bearer respectively supporting D2D communication via the wireless communication network to a first UE and a second UE, and storing, in a table, a packet filter including at least one of a source IP address of the D2D communication and a destination IP address of the D2D communication and an Identifier (ID) of the EPS bearer, upon receiving an IP packet from the first UE on the first EPS bearer, mapping the received IP packet to the second EPS bearer using the table, and transmitting the IP packet on the second EPS bearer.

In accordance with another aspect of the present disclosure, a UE apparatus for performing D2D communication using a wireless communication network is provided. The UE apparatus includes a transceiver configured to perform D2D communication via a direct communication path using an allocated IP address, and a controller configured to establish a first EPS bearer supporting D2D communication via the wireless communication network, to a P-GW, to determine to switch from the direct communication path to D2D communication via the wireless communication network, activate the first EPS bearer based on the determination, and to communicate an IP packet through the activated first EPS bearer. An IP packet transmitted through the first EPS bearer is not transmitted to a packet data network, or an IP packet received through the first EPS bearer may not be received from the packet data network.

In accordance with another aspect of the present disclosure, a P-GW apparatus for supporting D2D communication using a wireless communication network is provided. The P-GW apparatus includes a controller configured to establish a first EPS bearer and a second EPS bearer respectively supporting D2D communication via the wireless communication network to a first UE and a second UE, and to store, in a table, a packet filter including at least one of a source IP address of the D2D communication and a destination IP address of the D2D communication and an ID of the EPS bearer, and a transceiver configured to communicate an IP packet to/from at least one of the first UE and the second UE under control of the controller. Upon receiving an IP packet from the first UE on the first EPS bearer, the controller may map the received IP packet to the second EPS bearer using the table and transmit the IP packet on the second EPS bearer.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
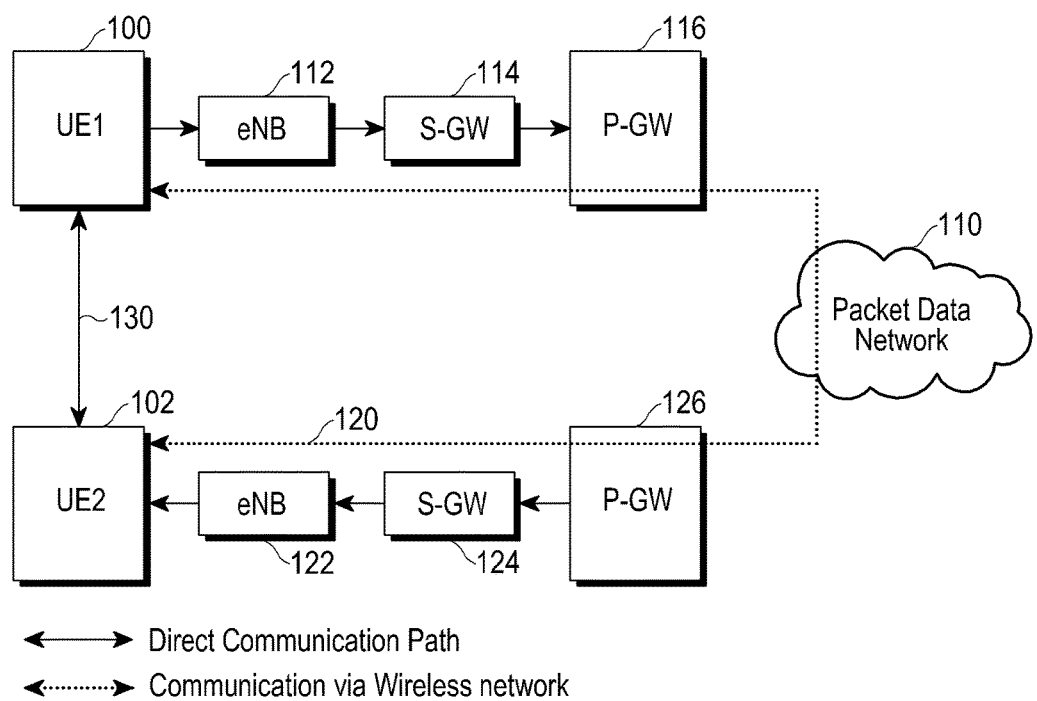
FIG. 1 illustrates communication paths between User Equipments (UEs) according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Prior to a detailed description of the present disclosure, interpretable meanings of some terms used herein will be presented by way of examples, but it is not intended to limit the disclosure thereto.

A base station, which is an entity communicating with a terminal, may be referred to as a Base Station (BS), a Node B (NB), an evolved Node B (eNB), an Access Point (AP), and/or the like.

A terminal, which is an entity communicating with a base station, may be referred to as a User Equipment (UE), a Mobile Station (MS), a Mobile Equipment (ME), a device, a terminal, and/or the like. The terminal may be an electronic device.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

In this disclosure, a new type of an Evolved Packet System (EPS) bearer is proposed. The new type of an EPS bearer will be referred to as a 'Proximity-based Service (ProSe) EPS bearer'. A ProSe EPS bearer may be established between a UE and a ProSe Packet Data Network (PDN) Gateway (P-GW). In the UL or DL direction, a ProSe EPS bearer between a UE and a ProSe P-GW may carry Internet Protocol (IP) packets from a UE, which are destined for another UE. The ProSe EPS bearer, which is an EPS bearer different from the existing bearer used for Device-to-Device (D2D) communication, may be referred to as a 'D2D EPS bearer' or a 'new EPS bearer'. The ProSe P-GW refers to a P-GW that supports establishment of the ProSe EPS bearer to a UE.

The existing EPS bearer between a UE and a P-GW, which is used to deliver IP packets of an IP flow between a UE and an IP entity in a Packet Data Network (PDN), will be referred to as a 'Non ProSe EPS bearer' in the present disclosure. In the UL direction, a Non ProSe EPS bearer between a UE and a P-GW may carry IP packets from the UE, which are destined for an IP entity in a PDN. In the DL direction, a Non ProSe EPS bearer between a UE and a P-GW may carry IP packets received from an IP entity in a PDN, which are destined for the UE in a wireless communication network.

For example, in the present disclosure, a PDN may mean a core network of a Long Term Evolution (LTE) system, and/or the like, and a wireless communication network may mean a Radio Access Network (RAN) of the LTE system, and/or the like.

In the present disclosure, a UE performing communication between UEs via a wireless communication network will be referred to as a ProSe UE.

Figure 4A:
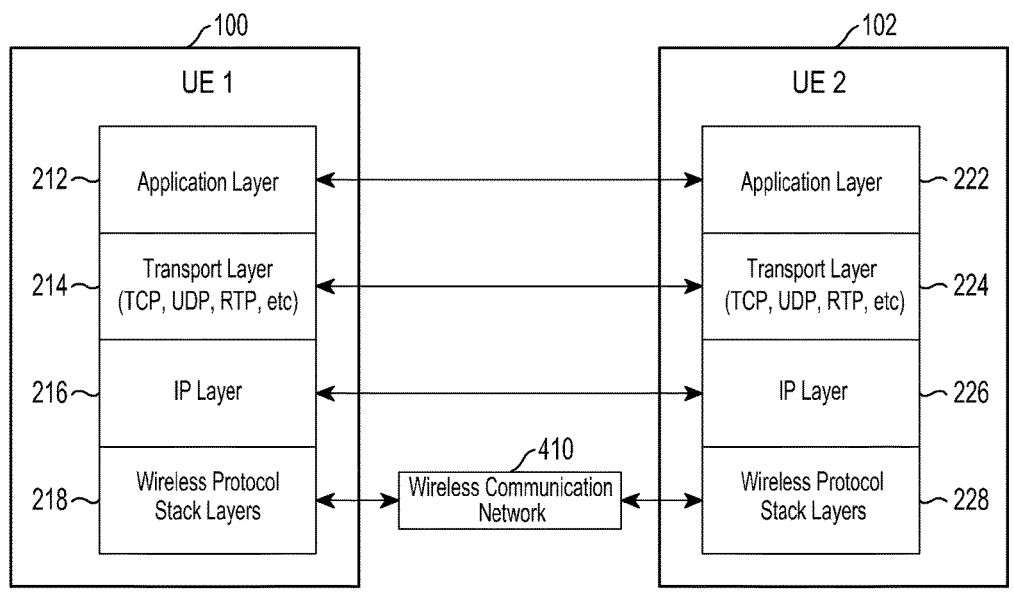
FIGS. 4A and 4B illustrate protocol layer interaction during communication between UEs via a wireless communication network according to an embodiment of the present disclosure.
Figure 4B:
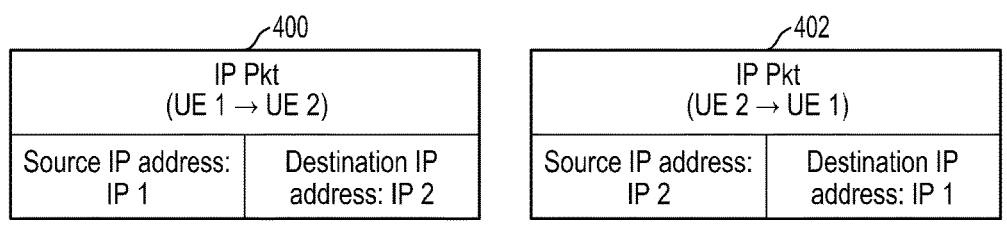

FIGS. 4A and 4B illustrate protocol layer interaction during communication between UEs via a wireless communication network according to an embodiment of the present disclosure.

Referring to FIGS. 4A and 4B, in a system of communication between UEs via a wireless communication network 410, a UE1 100 and a UE2 102 may establish an IP connection to an arbitrary server in a PDN. Thereafter, IP packets may be transmitted from the UE1 100 to the server in the PDN, and the server in the PDN may transmit the IP packets to the UE2 102. Similarly, IP packets may be transmitted from the UE2 102 to a server in the PDN, and the server in the PDN may transmit the IP packets to the UE1 100.

Various embodiments of the present disclosure propose communication between the UE1 100 and the UE2 102 via the wireless communication network 410. Herein, application layer 212 and application layer 222, transport layer 214 and transport layer 224, and IP layer 216 and IP layer 226 of the UE1 100 and the UE2 102 may directly communicate with each other as illustrated in FIG. 4A. Wireless protocol stack layers 218 and 228 of the UE1 100 and the UE2 102 may communicate with each other via the wireless communication network 410.

Figure 2A:
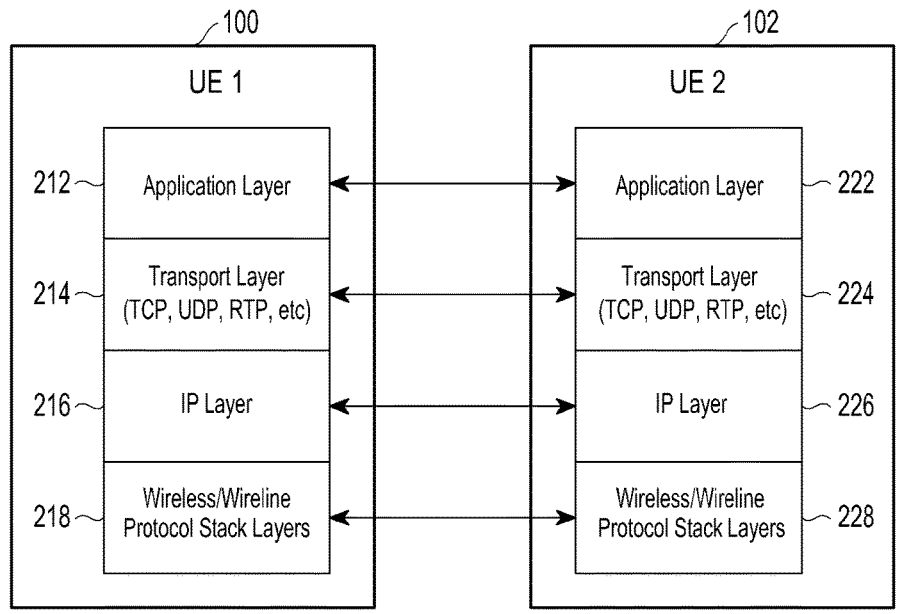
FIGS. 2A and 2B illustrate an Internet Protocol (IP) packet structure and a protocol stack for direct communication between UEs according to the related art.
Figure 2B:
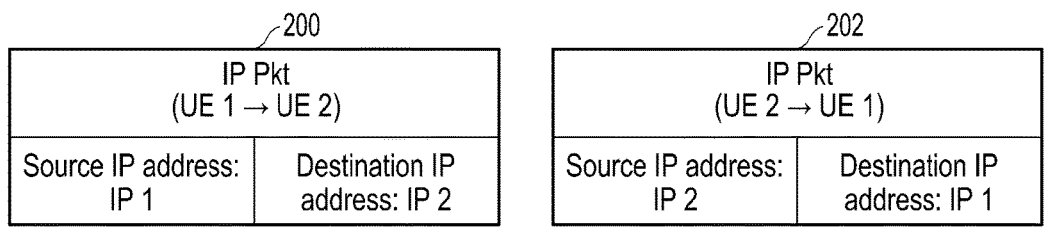
Figure 3:
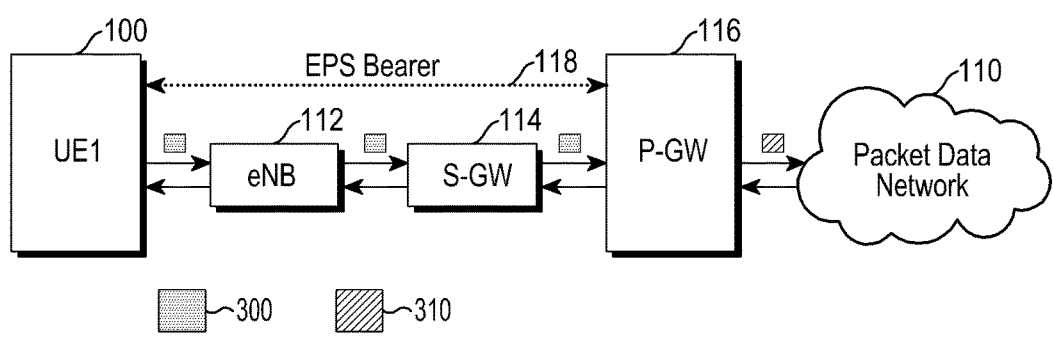
FIG. 3 illustrates a Packet Data Network (PDN) Gateway (P-GW) operation after communication path switching according to the related art.

In the present disclosure, the protocol layer interaction during communication between the UE1 100 and the UE2 102 over a direct communication path is as illustrated in FIG. 2A.

A description will now be made of IP address exchange in communication path switching according to various embodiments of the present disclosure.

The UE1 100 and the UE2 102 may use the IP addresses that are assigned to the UE1 100 and the UE2 102 by a network node (e.g., P-GW or IP server) for communication between each other. As illustrated in FIG. 4B, the UE1 100 and the UE2 102 may exchange IP addresses of each other, and transmit IP packets 400 and 402 including the IP addresses of each other.

If the UE1 100 and the UE2 102 start communication with each other on a communication path via the wireless communication network 410 (e.g., a direct communication path is not established yet to the UE1 100 and the UE2 102), IP addresses may be exchanged over the wireless communication network 410. Alternatively, if the UE1 100 and the UE2 102 start communication with each other on a communication path via the wireless communication network 410, the UE1 100 and the UE2 102 may know IP addresses of each other through the application server, ProSe server, or IP server in the PDN.

Alternatively, if the UE1 100 and the UE2 102 start communication with each other first on a direct communication path, IP addresses of the UE1 100 and the UE2 102 may be exchanged over the direct communication path. The exchange of IP addresses may be performed via wireless protocol stack layer 218 and wireless protocol stack layer 228, or via upper layers (e.g., application layer 212 and application layer 222, and/or the like).

If the UE1 100 and the UE2 102 start communication with each other first on a communication path via the wireless communication network 410 and then the UE1 100 and the UE2 102 switch to the direct communication path, exchange of IP addresses is not needed as the UE1 100 and the UE2 102 already have IP addresses of each other.

Similarly, if the UE1 100 and the UE2 102 start communication with each other first on a direct communication path and then the UE1 100 and the UE2 102 switch to a communication path via the wireless communication network 410, a request for IP addresses from the application server, ProSe server, IP server, and/or the like is not needed, because IP addresses of each other are already known.

Figure 5:
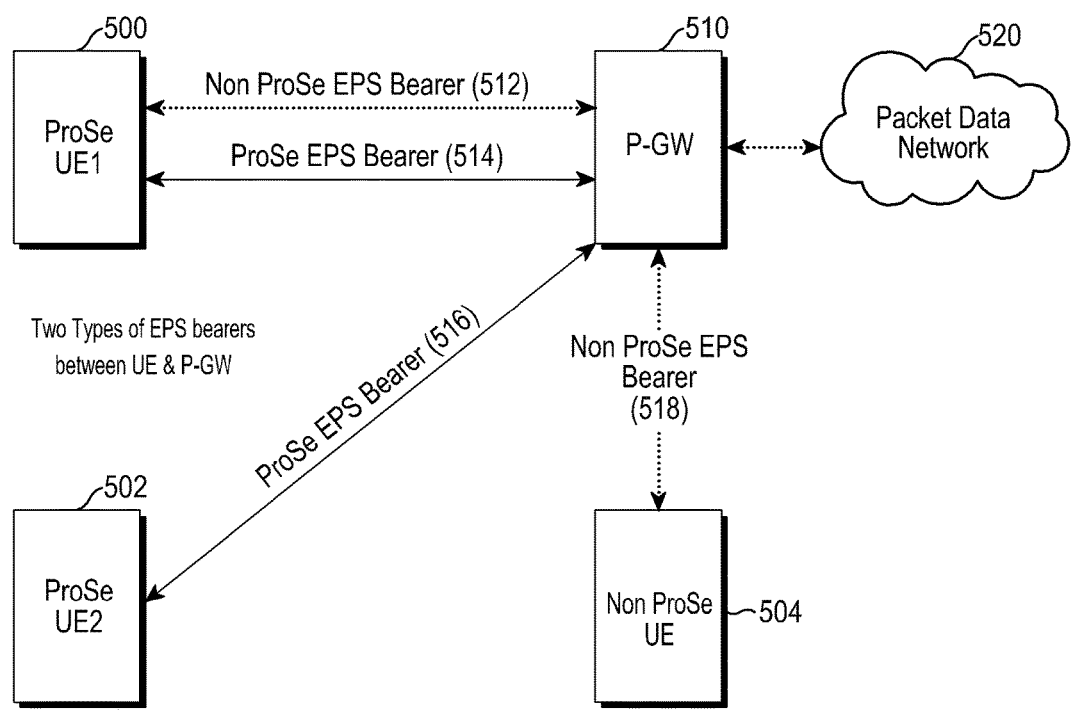
FIG. 5 illustrates packet bearers according to an embodiment of the present disclosure.

FIG. 5 illustrates packet bearers according to an embodiment of the present disclosure.

Referring to FIG. 5, a Non ProSe EPS bearer 512 may be established to deliver IP packets of an IP flow between a ProSe UE1 500 intending to perform D2D communication and an IP entity in a PDN 520.

In the UL or DL direction, a ProSe EPS bearer 514 between the ProSe UE1 500 and a P-GW 510 may carry IP packets from an arbitrary UE, which are destined for another UE. In the UL direction, the Non ProSe EPS bearer 512 between the ProSe UE1 500 and the P-GW 510 may carry IP packets received from the ProSe UE1 500, which are destined for the IP entity in the PDN 520. In the DL direction, the Non ProSe EPS bearer 512 may carry IP packets received from the IP entity in the PDN 520, which are destined for the ProSe UE1 500 in the wireless communication network.

According to various embodiments of the present disclosure, one or more ProSe EPS bearers and/or one or more Non ProSe EPS bearers may be established between the ProSe UE and the P-GW.

The ProSe UE1 500 may be a UE that has the capability to directly communicate with another ProSe UE2 502. The ProSe UE1 500 may establish the Non ProSe EPS bearer 512 to communicate with the IP entity in the PDN 520, and may also establish the ProSe EPS bearer 514 to communicate with another UE (e.g., ProSe UE2 502). The ProSe UE1 500 may simultaneously use ProSe EPS bearer 514 and the Non ProSe EPS bearer 512 to communicate simultaneously with the ProSe UE2 502 and the IP entity in the PDN 520.

One or more Non ProSe EPS bearers 518 may be established between a Non ProSe UE 504 and the P-GW 510. The Non ProSe UE 504 is a UE that does not have the capability to directly communicate with another UE. The EPS bearers, which can be established between the P-GW 510 and the ProSe UE1 500 and ProSe UE2 502 and the Non ProSe UE 504, are illustrated in FIG. 5.

According to various embodiments of the present disclosure, ProSe EPS bearers and Non ProSe EPS bearers may be established between ProSe UEs and the same P-GW. According to various embodiments of the present disclosure, ProSe EPS bearers and Non ProSe EPS bearers may be established between ProSe UEs and different P-GWs.

According to various embodiments of the present disclosure, different IP addresses may be assigned to a UE for ProSe EPS bearers and Non ProSe EPS bearers. According to various embodiments of the present disclosure, the same IP address may be assigned to a UE for both of ProSe EPS bearers and Non ProSe EPS bearers.

Figure 6:
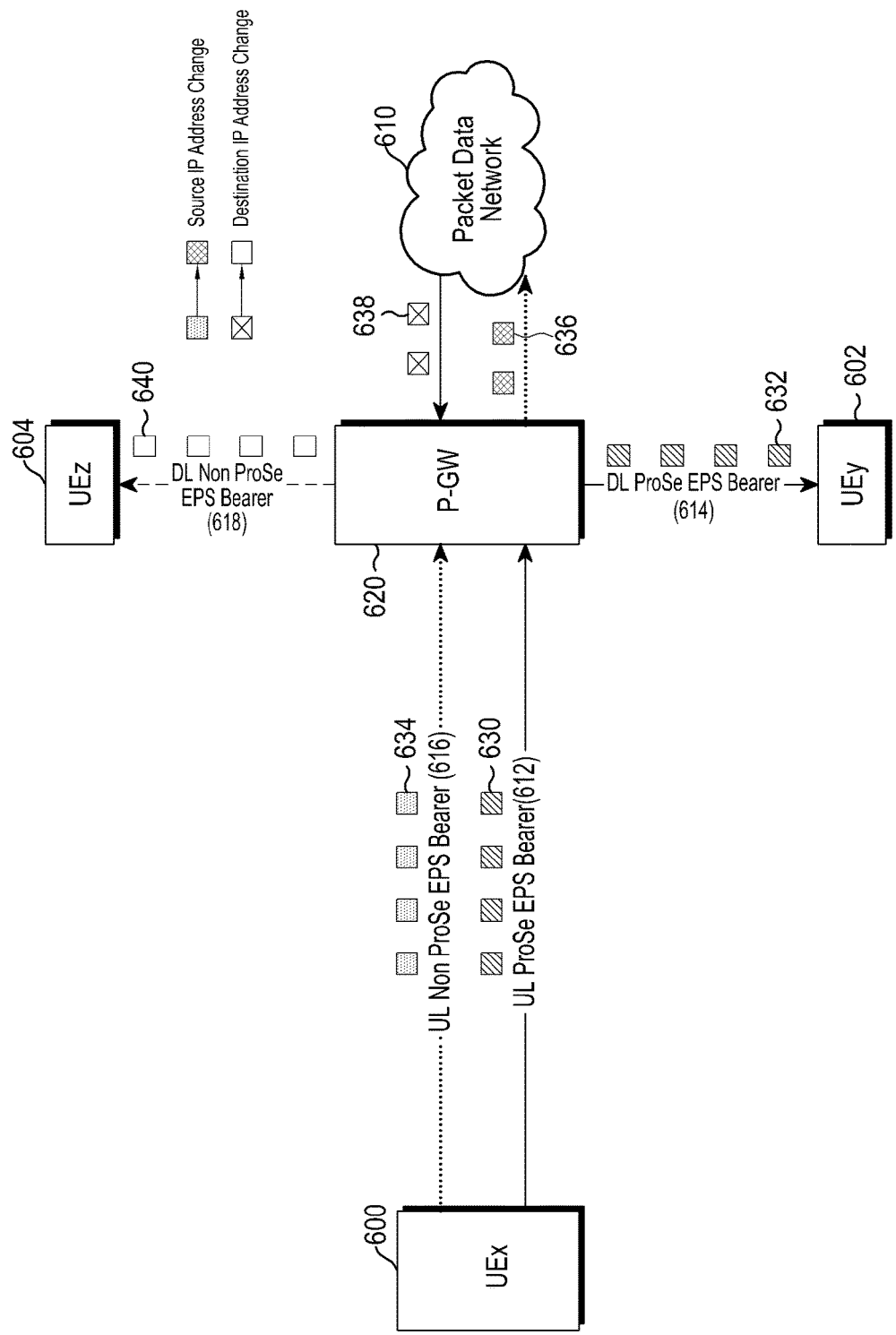
FIG. 6 illustrates a P-GW operation according to an embodiment of the present disclosure.

FIG. 6 illustrates a P-GW operation according to an embodiment of the present disclosure.

Referring to FIG. 6, a P-GW 620 may perform different operations on the IP packets of ProSe EPS bearer 612, ProSe EPS bearer 614, Non ProSe EPS bearer 616, and Non ProSe EPS bearer 618. According to various embodiments of the present disclosure, the different operations of the P-GW 620 may be performed by selectively applying the following three rules.

In a first rule, the P-GW 620 may change a source IP address in an IP packet received on a Non ProSe EPS bearer in the UL direction, and transmit the modified IP packet to a PDN 610. In other words, a local source IP address of the IP packet may be converted into a public source IP address. In conversion of the source IP address, the P-GW 620 may use a table for recording mapping information between a local IP address and a public IP address.

In a second rule, the P-GW 620 may not change addresses in an IP packet received on a ProSe EPS bearer in the UL direction. The P-GW 620 may transmit IP packets received on a UL ProSe EPS bearer over a DL ProSe EPS bearer using a ProSe DL Transmit Flow Template (TFT).

In a third rule, the P-GW 620 may change a destination IP address in the IP packet received from the PDN 610, and transmit the modified IP packet over a DL Non ProSe EPS bearer. The P-GW 620 may map IP packets received from the PDN 610 to Non ProSe EPS bearers using the Non ProSe DL TFT.

Specifically, with respect to the first rule, the P-GW 620 may perform the following operation on IP packets 634 received from a UEx 600 in a UL Non ProSe EPS bearer 616.

In the wireless communication network, if a local IP address is assigned to the UEx 600, the P-GW 620 may change a source IP address in the IP packet 634.

Subsequently, the P-GW 620 may transmit the modified IP packet 636 to the PDN 610.

Specifically, with respect to the second rule, the P-GW 620 may perform the following operation on IP packets 630, which are received from the UEx 600 on the UL ProSe EPS bearer 612.

The P-GW 620 may not change a source IP address and a destination IP address.

Subsequently, the P-GW 620 may determine the DL ProSe EPS bearer 614 on which the IP packets 630 received on the UL ProSe EPS bearer 612 need to be transmitted. The P-GW 620 may determine the DL ProSe EPS bearer 614 corresponding to the IP packets 630 received on the UL ProSe EPS bearer 612 using DL ProSe packet filters.

If the DL ProSe EPS bearer 614 is activated, the P-GW 620 may transmit the IP packets received on the UL ProSe EPS bearer 612 on the determined DL ProSe EPS bearer 614. For example, the P-GW 620 may transmit the IP packets 632 to a UEy 602. If the DL ProSe EPS bearer 614 is not activated, the P-GW 620 may trigger paging to the UEy 602 of the DL ProSe EPS bearer 614. The P-GW 620 may buffer the received packets on the UL ProSe EPS bearer 612 until the DL ProSe EPS bearer 614 is activated.

Specifically, with respect to the third rule, the P-GW 620 may perform the following operation on IP packets 638 received from the PDN 610.

The P-GW 620 may change a destination IP address in the IP packet 638, if a local IP address is assigned to a destination UE (e.g., UEz 604) in the wireless communication network.

Subsequently, the P-GW 620 may transmit the modified IP packet 640 to the UEz 604.

According to various embodiments of the present disclosure, packets of the UL ProSe EPS bearer 612 are mapped to the DL ProSe EPS bearer 614, whereas the same operation as that of the UL ProSe EPS bearer 612 is not performed for UL Non ProSe EPS bearer 616. In other words, the packets on the UL Non ProSe EPS bearer 616 may be transmitted to the PDN 610.

According to various embodiments of the present disclosure, as for packets of the UL ProSe EPS bearer 612, an IP address of the packets of the UL ProSe EPS bearer 612 may not be modified by the P-GW 620, whereas IP addresses of packets of the UL Non ProSe EPS bearer 616 may be modified by the P-GW 620.

According to various embodiments of the present disclosure, paging is triggered by the packets 630 received by the P-GW 620 on the UL ProSe EPS bearer 612, while the paging not triggered by the packets 634 received by the P-GW 620 on the UL Non ProSe EPS bearer 616.

FIGS. 7A, 7B, 7C, and 7D illustrate bearer mapping based on UL ProSe EPS bearers according to an embodiment of the present disclosure.

Figure 7A:
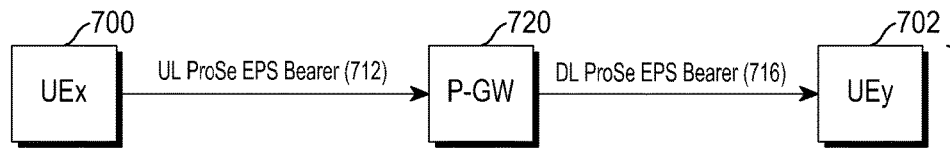
FIGS. 7A, 7B, 7C, and 7D illustrate bearer mapping based on UL Proximity-based Service (ProSe) Evolved Packet System (EPS) bearers according to an embodiment of the present disclosure.

Referring to FIG. 7A, according to various embodiments of the present disclosure, a UEx 700 may have only one UL ProSe EPS bearer 712, and the one UL ProSe EPS bearer 712 may be mapped to one DL ProSe EPS bearer 716 of another UE (e.g., UEy 702). In this case, the UEx 700 may communicate with (e.g., transmit IP packets to) only one other UE at a time.

Figure 7B:
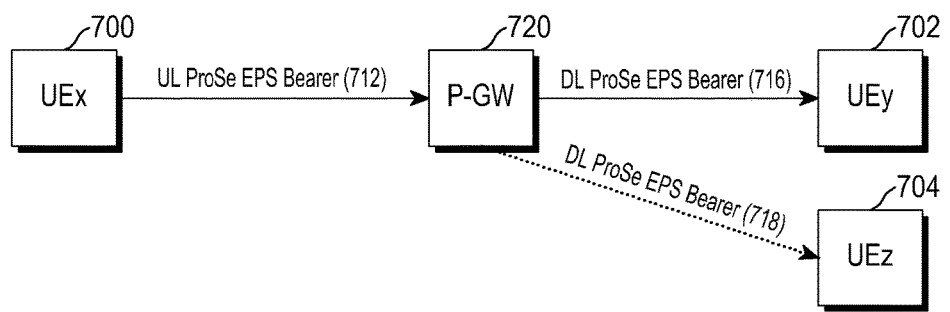

Referring to FIG. 7B, according to various embodiments of the present disclosure, the UEx 700 may have only one UL ProSe EPS bearer 712, and the one UL ProSe EPS bearer 712 may be mapped to one or more DL ProSe EPS bearers (e.g., DL ProSe EPS bearer 716 and DL ProSe EPS bearer 718). Herein, the UEy 702 and a UEz 704 may respectively have only one DL ProSe EPS bearer (e.g., UEy 702 has DL ProSe EPS bearer 716 and UEz 704 has DL ProSe EPS bearer 718). In this case, the UEx 700 may communicate with (e.g., transmit IP packets to) multiple UEs (e.g., UEy 702 and UEz 704) at a time, but differential QoS treatment may not be provided.

Figure 7C:
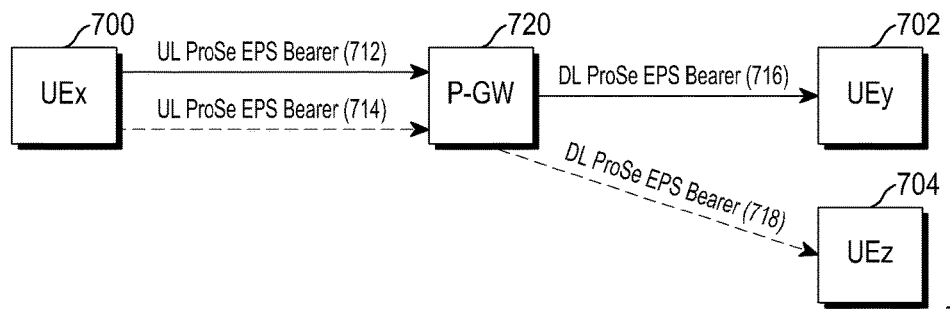

Referring to FIG. 7C, according to various embodiments of the present disclosure, the UEx 700 may have multiple UL ProSe EPS bearers (e.g., UL ProSe EPS bearer 712 and UL ProSe EPS bearer 714). Herein, the UL ProSe EPS bearer 712 and the UL ProSe EPS bearer 714 may be respectively mapped to DL ProSe EPS bearer 716 and DL ProSe EPS bearer 718 of different UEs, respectively. In this case, the UEx 700 may communicate with (e.g., transmit IP packets to) multiple UEs (e.g., UEy 702 and UEz 704) at a time. In addition, differential QoS treatment may be provided to communication with each of different UEs.

For the various embodiments of the present disclosure illustrated in FIGS. 7A, 7B and 7C, a P-GW 720 may use a DL ProSe packet filter including <*, Destination IP Address, DL ProSe EPS bearer ID>, which means that the P-GW 720 just checks (e.g., determines) the destination IP address in the IP packets received on the UL ProSe EPS bearer 712 or the UL ProSe EPS bearer 714, and then finds a DL ProSe EPS bearer corresponding to the destination IP address. If a DL ProSe EPS bearer is established between a UE and a P-GW, the P-GW 720 may add a packet filter including <*, IP Address of UE, DL ProSe EPS bearer ID> in the filter table.

Figure 7D:
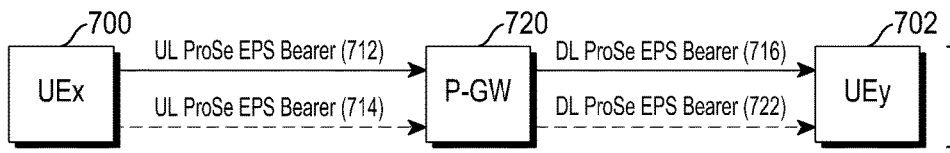

Referring to FIG. 7D, according to various embodiments of the present disclosure, the UEx 700 may have multiple UL ProSe EPS bearers (e.g., UL ProSe EPS bearer 712 and UL ProSe EPS bearer 714). Herein, the UL ProSe EPS bearer 712 and the UL ProSe EPS bearer 714 may be respectively mapped to DL ProSe EPS bearer 716 and DL ProSe EPS bearer 722 of one UEy 702. In this case, multiple applications of the UEx 700 may communicate with (e.g., transmit IP packets to) multiple applications of the UEy 702, which have different QoS requirements. However, in this case, a DL packet filter including <*, Destination IP Address, DL ProSe EPS bearer ID> may not be sufficient. The DL packet filter may also need to include a port number (e.g., a source port number, a destination port number, or both of the source port number and the destination port number) of an IP connection corresponding to a DL ProSe EPS bearer. In other words, the information that the P-GW 720 stores in the ProSe DL TFT may be added.

FIGS. 8A, 8B, 8C, and 8D illustrate bearer mapping based on DL ProSe EPS bearers according to an embodiment of the present disclosure.

Figure 8A:
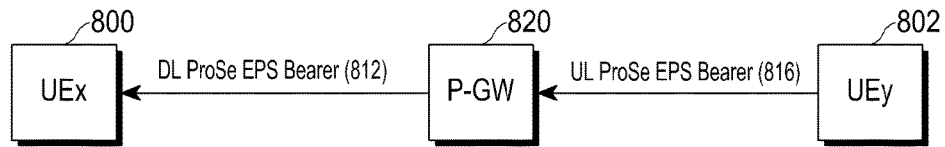
FIGS. 8A, 8B, 8C, and 8D illustrate bearer mapping based on DL ProSe EPS bearers according to an embodiment of the present disclosure.

Referring to FIG. 8A, according to various embodiments of the present disclosure, a UEx 800 may have only one DL ProSe EPS bearer 812, and the DL ProSe EPS bearer 812 may be mapped to one UL ProSe EPS bearer 816 of another UE (e.g., UEy 802). In this case, the UEx 800 may communicate with (e.g., receive IP packets from) only one other UE (UEy 802) at a time.

Figure 8B:
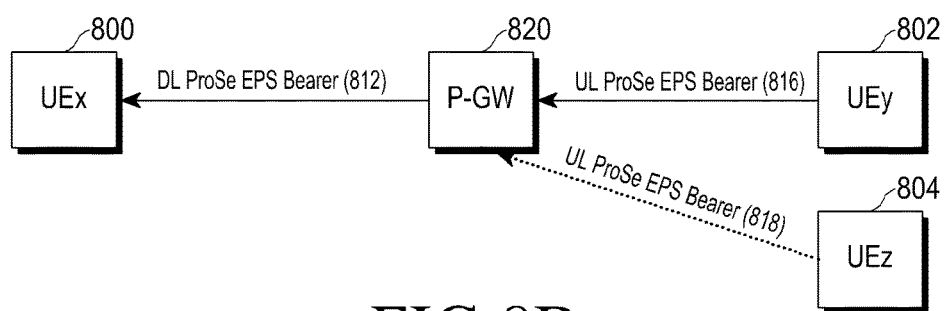

Referring to FIG. 8B, according to various embodiments of the present disclosure, the UEx 800 may have only one DL ProSe EPS bearer 812, and the one DL ProSe EPS bearer 812 may be mapped to one or more UL ProSe EPS bearers (e.g., UL ProSe EPS bearer 816 and UL ProSe EPS bearer 818). Herein, the UEy 802 and a UEz 804 may respectively have only one UL ProSe EPS bearer (e.g., UL ProSe EPS bearer 816 and UL ProSe EPS bearer 818). In this case, the UEx 800 may communicate with (e.g., receive IP packets from) multiple UEs (e.g., UEy 802 and UEz 804) at a time, but differential QoS treatment may not be provided.

For the various embodiments of the present disclosure, illustrated in FIGS. 8A and 8B, a P-GW 820 may use a DL ProSe packet filter including <*, Destination IP Address, DL ProSe EPS bearer ID>, which means that the P-GW 820 just checks (e.g., determines) the destination IP address in the IP packets received on the UL ProSe EPS bearer 816 or the UL ProSe EPS bearer 818, and then finds a DL ProSe EPS bearer corresponding to the destination IP address. If a DL ProSe EPS bearer is established between a UE and a P-GW, the P-GW 820 may add a packet filter including <*, IP Address of UE, DL ProSe EPS bearer ID> in the filter table.

Figure 8C:
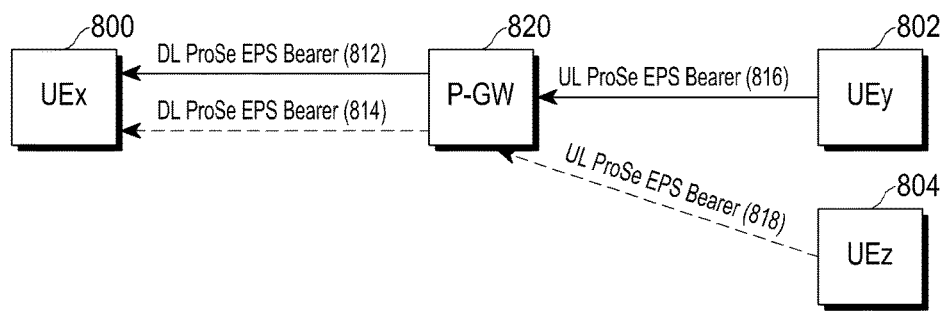

Referring to FIG. 8C, according to various embodiments of the present disclosure, the UEx 800 may have multiple DL ProSe EPS bearers (e.g., DL ProSe EPS bearer 812 and DL ProSe EPS bearer 814). Herein, the multiple DL ProSe EPS bearers (e.g., DL ProSe EPS bearer 812 and DL ProSe EPS bearer 814) may be respectively mapped to UL ProSe EPS bearers (e.g., UL ProSe EPS bearer 816 and UL ProSe EPS bearer 818) of different UEs (e.g., UEy 802 and UEz 804). In this case, the UEx 800 may communicate with (e.g., receive IP packets from) multiple UEs (e.g., UEy 802 and UEz 804) at a time, and differential QoS treatment may be provided for communication with each of the UEy 802 and the UEz 804. However, in this case, the DL packet filter including <*, Destination IP Address, DL ProSe EPS bearer ID> is not sufficient. The DL packet filter may also need to include the source IP address of an IP connection corresponding to a DL ProSe EPS bearer. In other words, the information that the P-GW 820 stores in the ProSe DL TFT may be added.

Figure 8D:
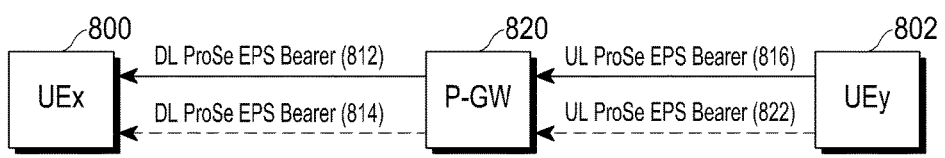

Referring to FIG. 8D, according to various embodiments of the present disclosure, the UEx 800 may have multiple DL ProSe EPS bearers (e.g., DL ProSe EPS bearer 812 and DL ProSe EPS bearer 814). Herein, the multiple DL ProSe EPS bearers (e.g., DL ProSe EPS bearer 812 and DL ProSe EPS bearer 814) may be respectively mapped to different UL ProSe EPS bearers (e.g., UL ProSe EPS bearer 816 and UL ProSe EPS bearer 822) of the same UE (e.g., UEy 802). In this case, multiple applications of the UEx 800 may communicate with (e.g., receive IP packets from) multiple applications of the UEy 802, which have different QoS requirements. However, in this case, a DL packet filter including <*, Destination IP Address, DL ProSe EPS bearer ID> is not sufficient. The DL packet filter may also need to include the port number (e.g., a source port number, a destination port number, or both of the source port number and the destination port number) of an IP connection corresponding to a DL ProSe EPS bearer. In other words, the information that the P-GW 820 stores in the ProSe DL TFT may be added.

According to various embodiments of the present disclosure, the IP packets received on one or more UL ProSe EPS bearers in the UL direction may be transmitted on one or more DL ProSe EPS bearers. A P-GW may use DL packet filters to filter the IP packets received on UL ProSe EPS bearers, and map the IP packets to DL ProSe EPS bearers. The ProSe DL packet filters in TFT needed for various types of bearers mapping according to various embodiments of the present disclosure are illustrated in FIGS. 9, 10A, 10B, 11, and 12.

Figure 9:
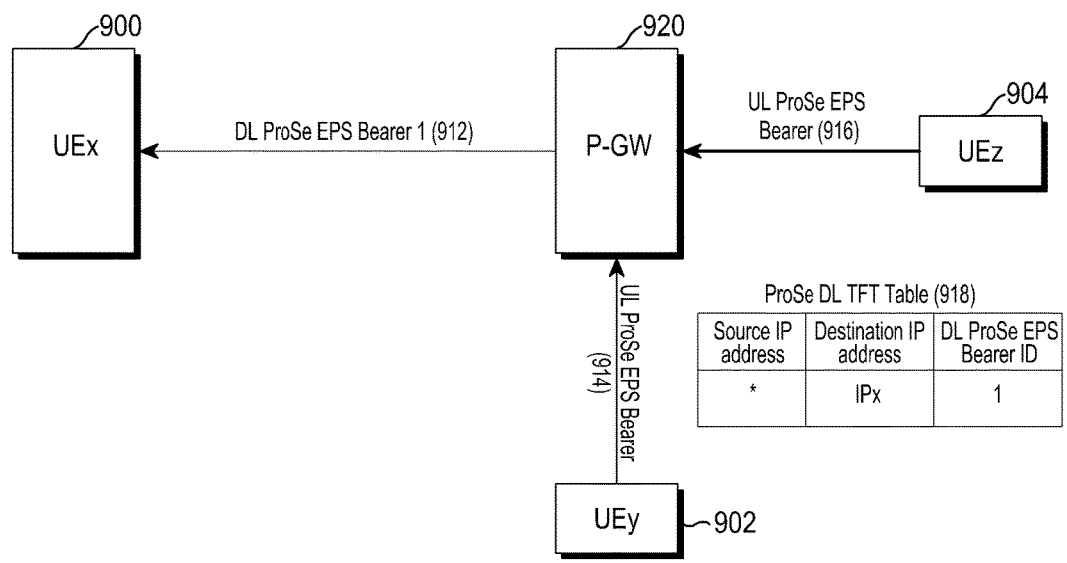
FIG. 9 illustrates establishment of ProSe EPS bearers and a packet filter table according to an embodiment of the present disclosure.

FIG. 9 illustrates establishment of ProSe EPS bearers and a packet filter table according to an embodiment of the present disclosure.

Referring to FIG. 9, according to various embodiments of the present disclosure, if a UEx 900 has only one DL ProSe EPS bearer 912, a P-GW 920 may add a DL packet filter including <*, IP Address of UE with DL ProSe EPS bearer, DL ProSe EPS bearer ID>. The P-GW 920 may add the DL packet filter to a packet filter table 918, if the DL ProSe EPS bearer is established with the UEx 900 and the P-GW 920. In this case, there is no impact of how many UEs (e.g., UEy 902 and UEz 904), each of which has a DL ProSe EPS bearer and is communicating. The P-GW 920 does not need to know the source IP addresses (e.g., IP addresses of UEy 902 and UEz 904) of each UE with which the UEx 900 with a DL ProSe EPS bearer is communicating for packet filtering.

Specifically, the DL ProSe EPS bearer #1 912 may be established between the UEx 912 and the P-GW 920. The UEx 900 is communicating with the UEy 902 and the UEz 904. The P-GW 920 may add a DL packet filter including <*, IP Address of UEx, 1> to the packet filter table. Any IP packet that is received by the P-GW 920 on the UL ProSe EPS bearer (e.g., UL ProSe EPS bearer 914 with the UEy 902 and the UL ProSe EPS bearer 916 with the UEz 904) and has a destination IP address of the UEx 900 in the IP packet may be mapped to and transmitted on the DL ProSe EPS bearer #1 912 by the P-GW 920.

If a value of a source IP address of the illustrative ProSe DL TFT table 918 is '*', the value may indicate that the P-GW 920 does not need to know the source IP addresses of the DL ProSe EPS bearer.

Figure 10A:
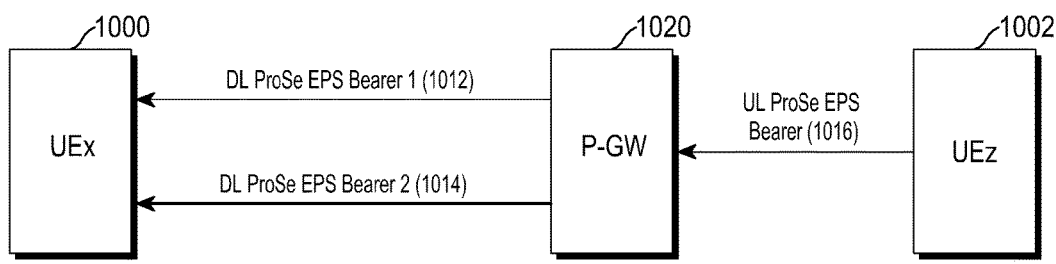
FIGS. 10A and 10B illustrate establishment of ProSe EPS bearers and a packet filter table according to an embodiment of the present disclosure.
Figure 10B:
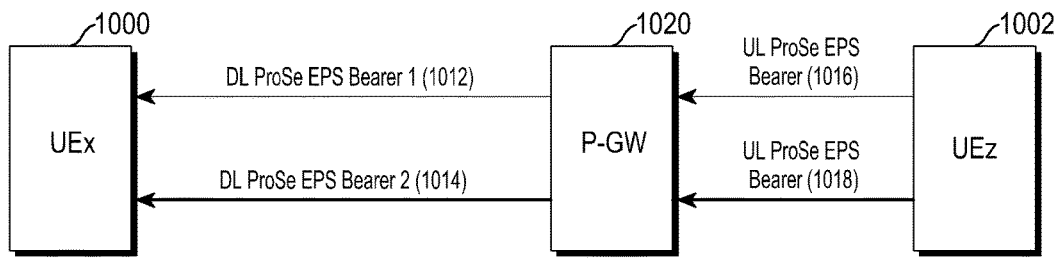

FIGS. 10A and 10B illustrate establishment of ProSe EPS bearers and a packet filter table according to an embodiment of the present disclosure.

Referring to FIGS. 10A and 10B, according to various embodiments of the present disclosure, if a UEx 1000 has multiple DL ProSe EPS bearers (e.g., DL ProSe EPS bearer 1012 and DL ProSe EPS bearer 1014), and each of the multiple DL ProSe EPS bearers (e.g., DL ProSe EPS bearer 1012 and DL ProSe EPS bearer 1014) needs to receive IP packets from one or more UL ProSe EPS bearers (e.g., UL ProSe EPS bearer 1016 and/or UL ProSe EPS bearer 1018) of same UE (e.g., UEz 1002), then a P-GW 1020 may add a DL packet filter including <*, IP Address of UE with DL ProSe EPS bearer, Port Number, DL ProSe EPS bearer ID>.

FIG. 10A illustrates a case in which the UEz 1002 transmits an IP packet on one UL ProSe EPS bearer 1016, and FIG. 10B illustrates a case in which the UEz 1002 transmits IP packets on two UL ProSe EPS bearers (e.g., UL ProSe EPS bearer 1016 and UL ProSe EPS bearer 1018). The P-GW 1020 may add the DL packet filter to a packet filter table 1010 if the DL ProSe EPS bearers 1012 and 1014 are established between the UEx 1000 and the P-GW 1020. A port number (e.g., a source port number, a destination port number, or both of the source port number and the destination port number) may be provided by the UEx 1000 at the time of establishment of a DL ProSe EPS bearer.

Specifically, the DL ProSe EPS bearer #1 1012 and the DL ProSe EPS bearer #2 1014 may be established between the UEx 1000 and the P-GW 1020. The UEx 1000 is communicating with the UEz 1002. The P-GW 1020 may add a DL packet filter including <*, IP Address of UEx, 1, 1> and <*, IP Address of UEx, 2, 2> to the packet filter table 1010. Any IP packet that is received by the P-GW 1020 on the UL ProSe EPS bearer and has a destination IP address of the UEx 1000 in the IP packet and Port 1, may be transmitted on the DL ProSe EPS bearer #1 1012 by the P-GW 1020. Any IP packet that is received by the P-GW 1-2- on the UL ProSe EPS bearer and has a destination IP address of the UEx 1000 in the IP packet and Port 2 may be transmitted on the DL ProSe EPS bearer #2 1014 by the P-GW 1020.

Figure 11:
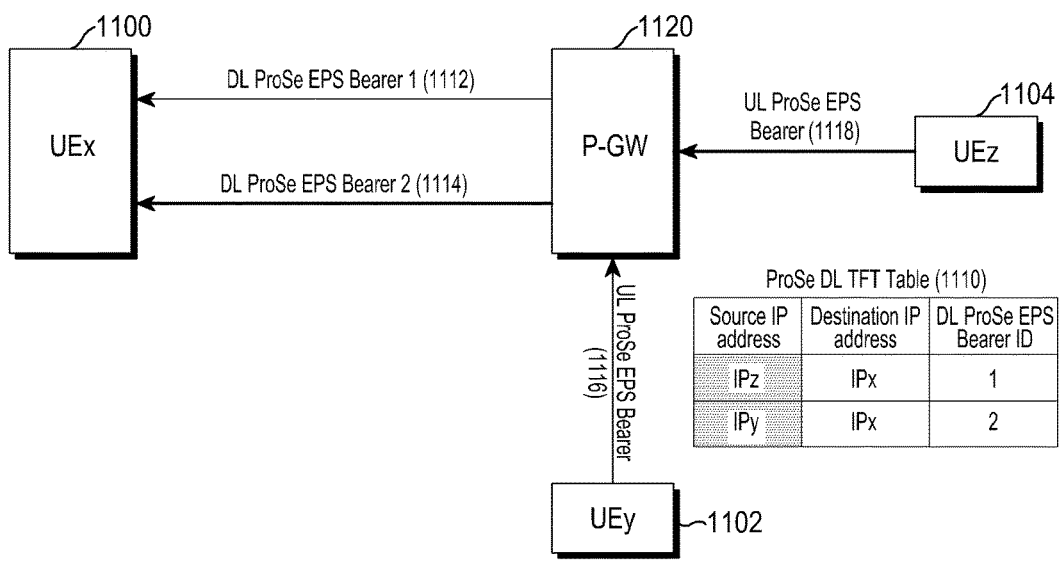
FIG. 11 illustrates establishment of ProSe EPS bearers and a packet filter table according to an embodiment of the present disclosure.

FIG. 11 illustrates establishment of ProSe EPS bearers and a packet filter table according to an embodiment of the present disclosure.

Referring to FIG. 11, according to various embodiments of the present disclosure, if a UEx 1100 has multiple DL ProSe EPS bearers (e.g., DL ProSe EPS bearer 1112 and DL ProSe EPS bearer 1114), and each of the multiple DL ProSe EPS bearers (e.g., DL ProSe EPS bearer 1112 and DL ProSe EPS bearer 1114) needs to receive IP packets from different UL ProSe EPS bearers (e.g., UL ProSe EPS bearer 1116 and UL ProSe EPS bearer 1118) of different UEs (e.g., UEy 1102 and UEz 1104), then a P-GW 1120 may add a DL packet filter including <Source IP Address of UE, IP Address of UE with DL ProSe EPS bearer, DL ProSe EPS bearer ID>. The P-GW 1120 may add the DL packet filter to a packet filter table 1110 if the DL ProSe EPS bearers (e.g., DL ProSe EPS bearer 1112 and DL ProSe EPS bearer 1114) are established between the UEx 1100 and the P-GW 1120. In this case, the P-GW 1120 needs to know, as source IP addresses, the IP addresses of UEs (e.g., UEy 1102 and UEz 1104) with which the UEx 1100 with the multiple DL ProSe EPS bearers (e.g., DL ProSe EPS bearer 1112 and DL ProSe EPS bearer 1114) is communicating. The IP addresses of the UEy 1102 and the UEz 1104, with which the UEx 1100 is connecting, may be provided by the UEx 1100 at the time of establishment of the DL ProSe EPS bearers (e.g., DL ProSe EPS bearer 1112 and DL ProSe EPS bearer 1114).

Specifically, the DL ProSe EPS bearer #1 1112 and the DL ProSe EPS bearer #2 1114 may be established between the UEx 1100 and the P-GW 1120. The UEx 1100 is communicating with the UEz 1104 and the UEy 1102. The P-GW 1120 may add a DL packet filter including <IP Address of UEy, IP Address of UEx, 1> and <IP Address of UEz, IP Address of UEx, 2> to the packet filter table 1110. Any IP packet that is received by the P-GW 1120 on the UL ProSe EPS bearer 1116 and has a destination IP address of the UEx 1100 and a source IP address of the UEy 1102 in the IP packet may be transmitted on the DL ProSe EPS bearer #1 1112 by the P-GW 1120. Any IP packet that is received by the P-GW 1120 on the UL ProSe EPS bearer 1118 and has a destination IP address of the UEx 1100 and a source IP address of the UEz 1104 in the IP packet may be transmitted on the DL ProSe EPS bearer #2 1114 by the P-GW 1120.

Figure 12:
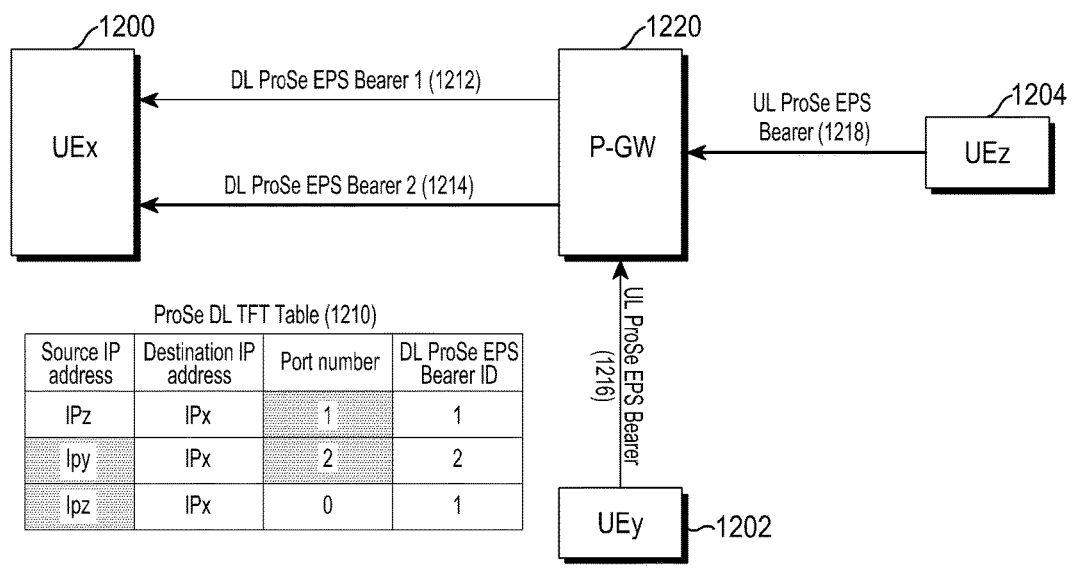
FIG. 12 illustrates establishment of ProSe EPS bearers and a packet filter table according to an embodiment of the present disclosure.

FIG. 12 illustrates establishment of ProSe EPS bearers and a packet filter table according to an embodiment of the present disclosure.

Referring to FIG. 12, according to various embodiments of the present disclosure, if a UEx 1200 has multiple DL ProSe EPS bearers (e.g., DL ProSe EPS bearer 1212 and DL ProSe EPS bearer 1214), and each of the multiple DL ProSe EPS bearers (e.g., DL ProSe EPS bearer 1212 and DL ProSe EPS bearer 1214) needs to receive IP packets from different UL ProSe EPS bearers (e.g., UL ProSe EPS bearer 1216 and UL ProSe EPS bearer 1218) of different UEs (e.g., UEy 1202 and UEz 1204), and IP packets from different applications of one UE (e.g., UEy 1202), then a P-GW 1220 may add a DL packet filter including <Source IP Address of UE, IP Address of UE with DL ProSe EPS bearer, Port Number, DL ProSe EPS bearer ID>. The P-GW 1220 may add the DL packet filter to a packet filter table 1210 if the DL ProSe EPS bearers (e.g., DL ProSe EPS bearer 1212 and DL ProSe EPS bearer 1214) are established between the UEx 1200 and the P-GW 1220. In this case, the P-GW 1220 needs to know, as source IP addresses, the IP addresses of UEs (e.g., UEy 1202 and UEz 1204) with which the UEx 1200 with multiple DL ProSe EPS bearers (e.g., DL ProSe EPS bearer 1212 and DL ProSe EPS bearer 1214) is communicating. The P-GW 1220 also needs to know the port numbers of multiple IP connections of the UEx 1200 if the multiple IP connections need to be mapped to different DL ProSe EPS bearers (e.g., DL ProSe EPS bearer 1212 and DL ProSe EPS bearer 1214). The required port number information may be provided by the UEx 1200 at the time of establishment of the DL ProSe EPS bearers (e.g., DL ProSe EPS bearer 1212 and DL ProSe EPS bearer 1214).

Specifically, the DL ProSe EPS bearer #1 1212 and the DL ProSe EPS bearer #2 1214 may be established between the UEx 1200 and the P-GW 1220. The UEx 1200 is communicating with the UEz 1204 and the UEy 1202. In the illustrative packet filter table 1210, two IP connections exist between the UEx 1200 and the UEy 1202, which need to be mapped to different DL ProSe EPS bearers 1212 and 1214 of the UEx 1200. One or more IP connections exist between the UEx 1200 and the UEz 1204, which need to be mapped to only one DL ProSe EPS bearer. In other words, the P-GW 1220 may add a DL packet filter including <IP Address of UEy, IP Address of UEx, 1, 1>, <IP address of UEy, IP Address of UEx, 1, 2> and <IP address of UEz, IP Address of UEx, 0, 2> to the packet filter table 1210.

According to various embodiments of the present disclosure, the information by the UE to the P-GW for the DL packet filter may be transmitted at the time of establishment of the DL/UL ProSe EPS bearers. The information by the UE to the P-GW for the DL packet filter may also be transmitted later or updated if IP connections are created or released between UEs. The information for the DL packet filter may also be updated if the UE starts communicating with new UEs.

Figure 13A:
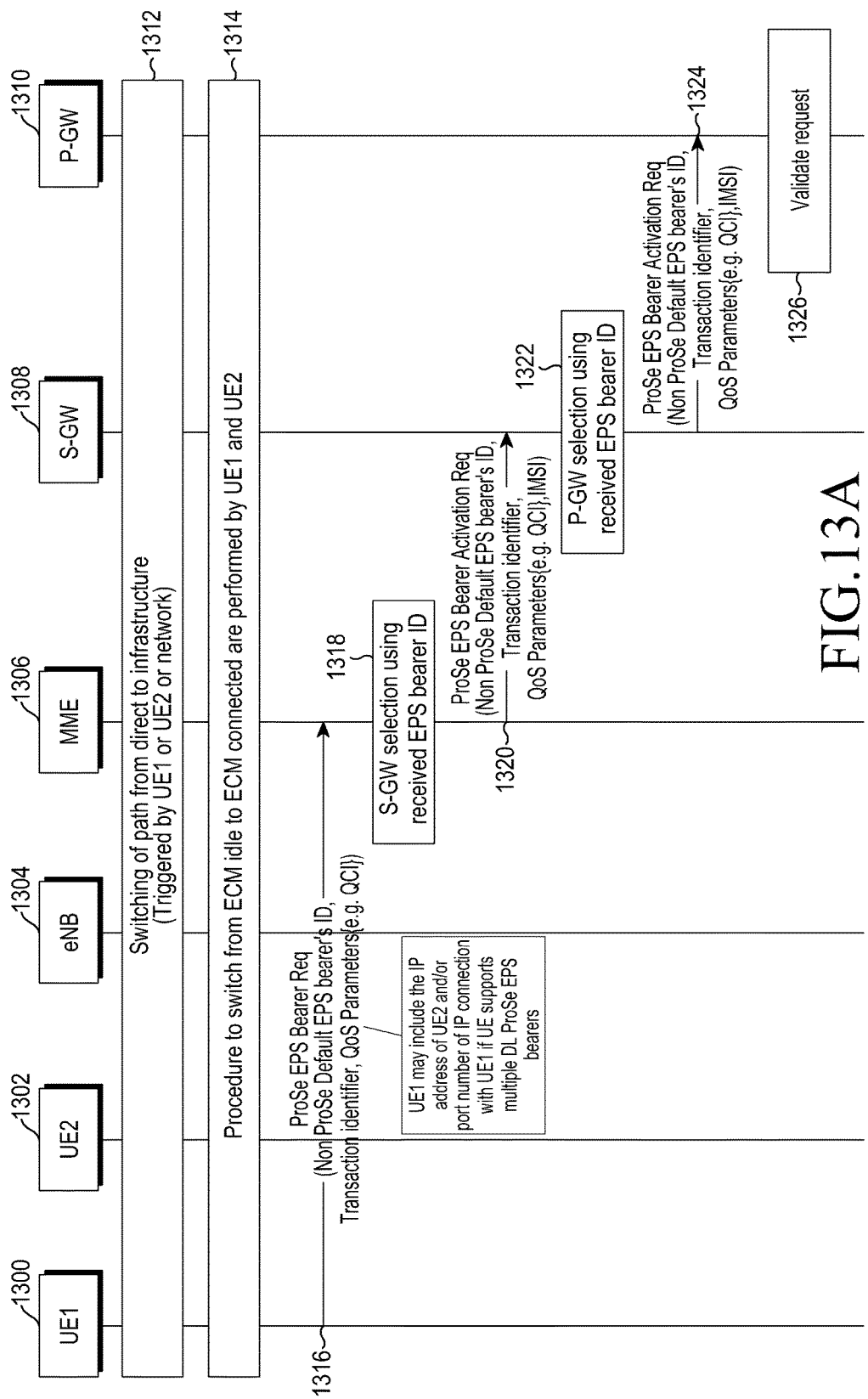
FIGS. 13A, 13B, and 13C illustrate a ProSe EPS bearer creation procedure according to an embodiment of the present disclosure.
Figure 13B:
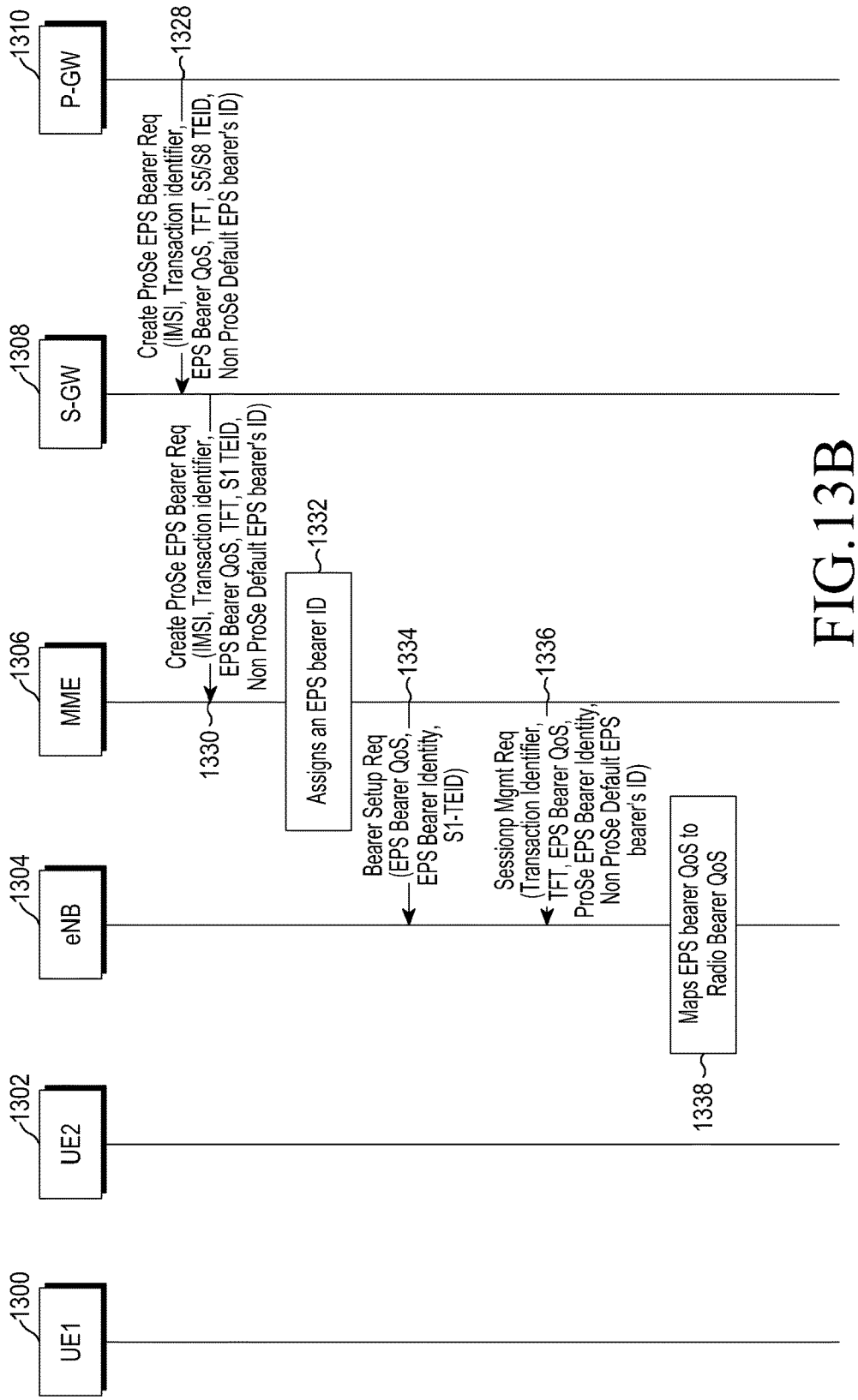
Figure 13C:
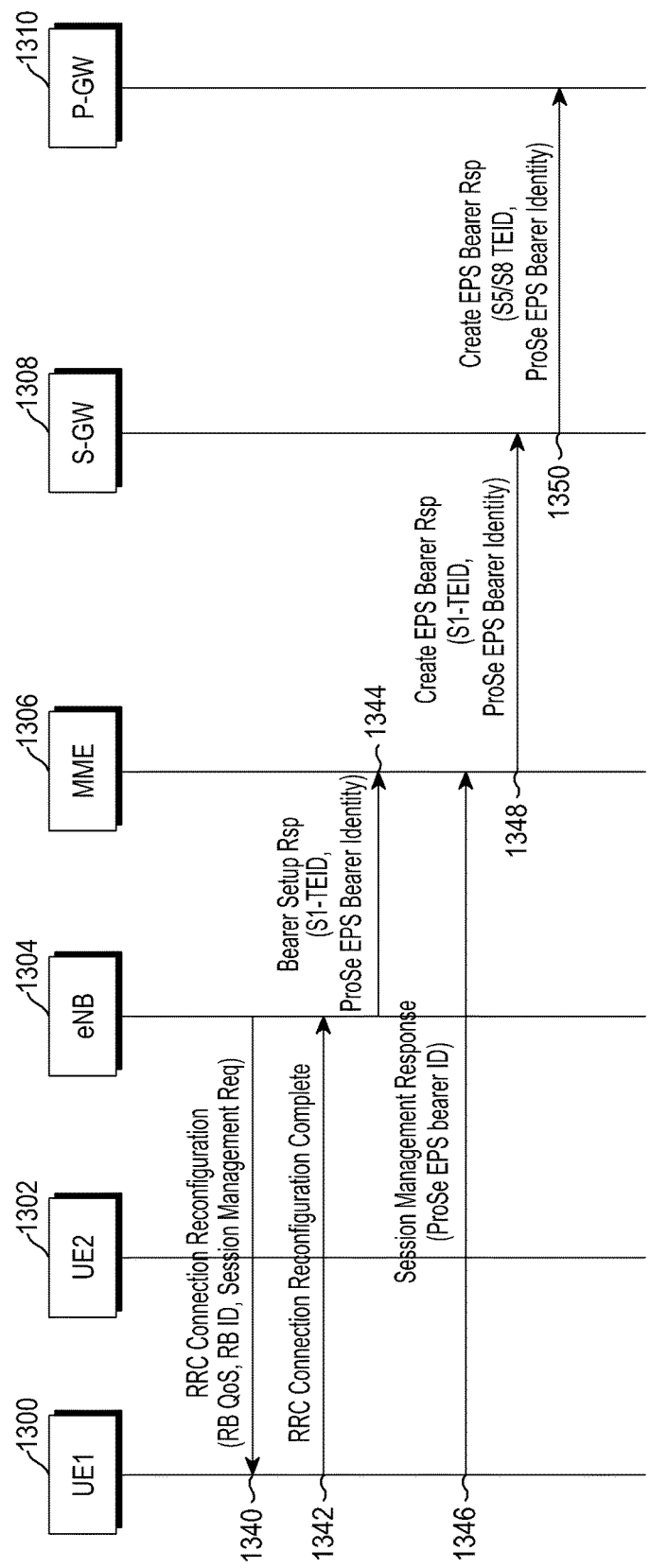

FIGS. 13A, 13B, and 13C illustrate a ProSe EPS bearer creation procedure according to an embodiment of the present disclosure.

Reference will be made to FIGS. 13A, 13B, and 13C to describe the ProSe EPS bearer creation procedure performed when a Default EPS bearer already exists.

At operation 1312, a UE1 1300 and a UE2 1302, which were communicating with each other via a direct communication path, may determine to switch to a communication path that uses a wireless communication network. Triggering of the switching may be performed by the UE1 1300 and the UE2 1302 or by an arbitrary node of the wireless communication network. The node of the wireless communication network may include at least one of an eNB 1304, Mobility Management Entity (MME) 1306, an S-GW 1308, a P-GW 1310, and/or the like.

Thereafter, at operation 1314, a procedure for switching from an EPS Connection Management (ECM) idle state to an ECM connected state may be performed by the UE1 1300 or the UE2 1302.

At operation 1316, the UE1 1300 may transmit a ProSe EPS Bearer Request message to an MME 1306. The UE1 1300 may include in the ProSe EPS Bearer Request message at least one of a Non ProSe EPS bearer ID which is an ID of a default bearer, a transaction identifier, QoS parameters, and/or the like. The UE1 1300 may include in the ProSe EPS Bearer Request message at least one of an IP address(es) of other UE(s) with which the UE1 1300 is communicating, and port number(s) of IP connections if the UE1 1300 supports multiple DL ProSe EPS bearers. Whether the IP addresses or the port numbers are included may be determined depending on the above-described mapping relationship between the DL and UL ProSe EPS bearers.

At operation 1318, upon receiving the ProSe EPS Bearer Request message, the MME 1306 may select the S-GW 1308 based on the Non ProSe EPS bearer ID included in the received ProSe EPS Bearer Request message.

At operation 1320, the MME 1306 may transmit a ProSe EPS Bearer Activation Request message to the selected S-GW 1308. The MME 1306 may include the parameters received from the UE1 1300 and the International Mobile Subscriber Identity (IMSI) of the UE1 1300 in the ProSe EPS Bearer Activation Request message.

At operation 1322, upon receiving the ProSe EPS Bearer Activation Request message, the S-GW 1308 may select the P-GW 1310 based on a Non ProSe EPS bearer ID included in the received ProSe EPS Bearer Activation Request message.

At operation 1324, the S-GW 1308 may transmit the ProSe EPS Bearer Activation Request message to the selected P-GW 1310. The S-GW 1308 may include the parameters received from the MME 1306 in the ProSe EPS Bearer Activation Request message.

At operation 1326, upon receiving the ProSe EPS Bearer Activation Request message, the P-GW 1310 may validate the ProSe EPS Bearer Activation request by checking the policy and subscription information of the UE1 1300 with Policy and Charging Rules Function (PCRF)/Home Subscriber Server (HSS).

Thereafter, at operation 1328, the P-GW 1310 may transmit a Create ProSe EPS Bearer Request message to the S-GW 1308. The P-GW 1310 may include at least one of the parameters (e.g., Non ProSe Default EPS bearer ID, transaction identifier, EPS bearer QoS, IMSI or UE, TFT, S5/S8 Tunnel Endpoint Identifier (TEID)) in the Create ProSe EPS Bearer Request message.

At operation 1330, upon receiving the Create ProSe EPS Bearer Request message, the S-GW 1308 may create an S1 bearer and store mapping between S1 TEID and S5/S8 TEID received from the P-GW 1310. In addition, at operation 1330, the S-GW 1308 may transmit the Create ProSe EPS Bearer Request message to the MME 1306. The S-GW 1308 may include at least one of the parameters (e.g., Non ProSe Default EPS bearer ID, transaction identifier, EPS bearer QoS, IMSI of UE, TFT, S1 TEID) in the Create ProSe EPS Bearer Request message.

At operation 1332, upon receiving the Create ProSe EPS Bearer Request message, the MME 1306 may assign an EPS bearer ID to a new ProSe EPS bearer.

At operation 1334, the MME 1306 may then transmit a Bearer Setup Request message to the eNB 1304. The MME 1306 may include at least one of the parameters (e.g., EPS bearer QoS, ProSe EPS bearer ID and S1 TEID) in the Bearer Setup Request message.

At operation 1336, the MME 1306 may also build a Session Management Request message including at least one of transaction identifier, Non ProSe Default EPS bearer ID, EPS bearer QoS, TFT and ProSe EPS bearer ID, and may transmit the Session Management Request message to the eNB 1304. The Session Management Request message may be transparently transmitted to the UE1 1300 by the eNB 1304.

At operation 1338, upon receiving the Bearer Setup Request message, the eNB 1304 may map the EPS bearer QoS included in the Bearer Setup Request message to a radio bearer QoS, and establish the radio bearer to the UE1 1300.

At operation 1340, the eNB 1304 may transmit a Radio Resource Control (RRC) Connection Reconfiguration message including at least one of radio bearer ID, Session management request and radio bearer QoS, to the UE1 1300.

At operation 1342, UE1 1300 may transmit an RRC Connection Reconfiguration Complete message to the eNB 1304.

At operation 1334, the eNB 1304 may then transmit a Bearer Setup Response message including at least one of ProSe EPS bearer ID and S1 TEID to the MME 1306.

At operation 1346, the UE1 1300 may also transmit a Session Management Response message to the MME 1306. The Session Management Response message may include ProSe EPS bearer ID.

At operation 1348, the MME 1306 may then transmit a Create EPS Bearer Response message including at least one of ProSe EPS bearer ID and S1 TEID to the S-GW 1308.

At operation 1350, the S-GW 1308 may then transmit the Create EPS Bearer Response message including at least one of ProSe EPS bearer ID and S5/S8 TEID to the P-GW 1310.

If the existing messages as defined in current system for EPS bearer creation/activation/modification/release are used for ProSe EPS bearer creation/activation/modification/release, then whether the message is for ProSe EPS bearer or for Non ProSe EPS bearer may be indicated using reserved fields in the TFT or message, using or a new field in the TFT or message.

Figure 14:
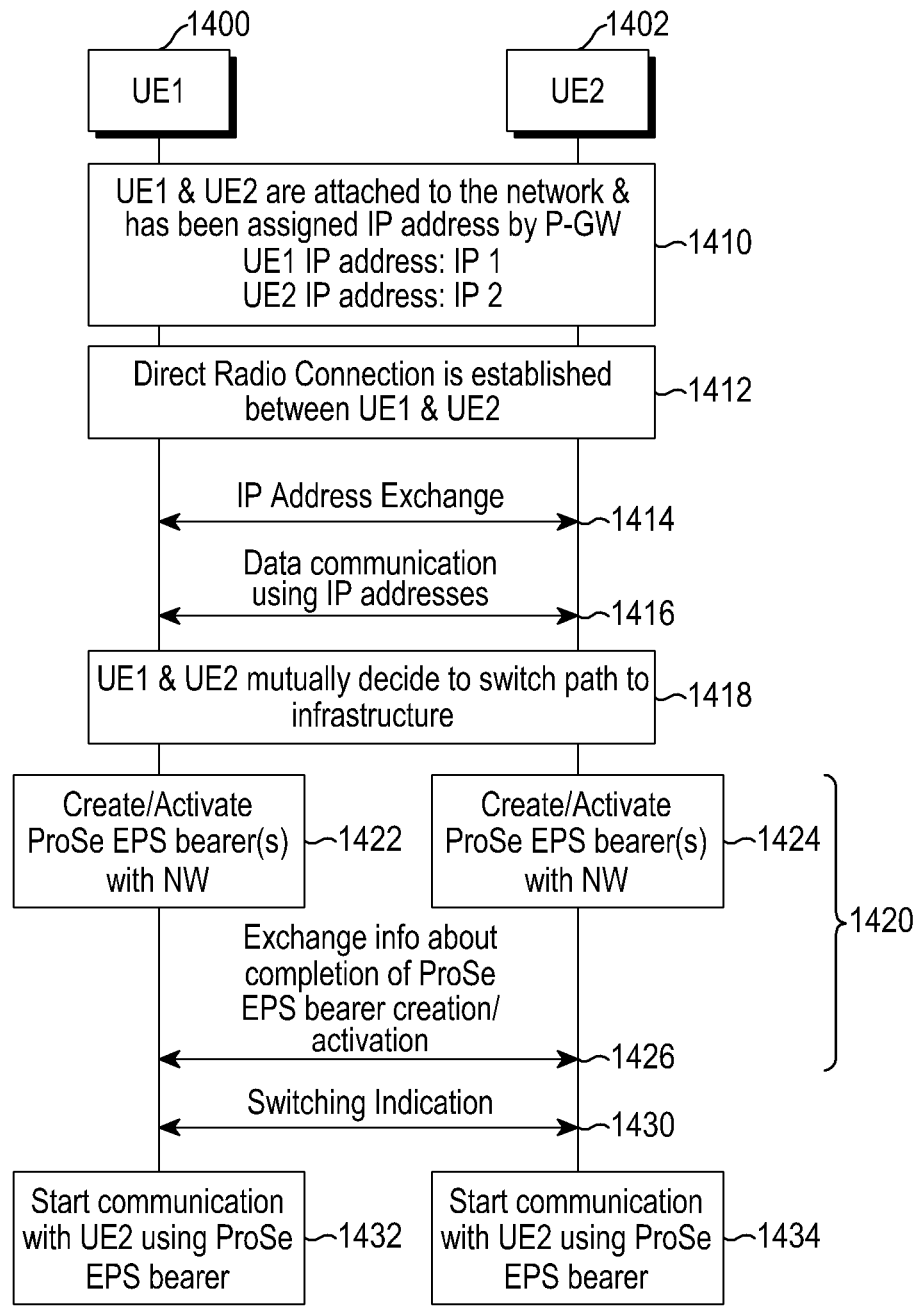
FIG. 14 illustrates a communication path switching method according to an embodiment of the present disclosure.

FIG. 14 illustrates a communication path switching method according to an embodiment of the present disclosure.

Reference will be made to FIG. 14 to describe a method of switching a path from a direct communication path to a communication path via the wireless communication network according to various embodiments of the present disclosure. A signaling flow for switching from a direct communication path to a communication path via the wireless communication network is as follows.

A UE1 1400 and a UE2 1402 are attached to the wireless communication network. At operation 1410, the UE1 1400 and the UE2 1402 may be respectively assigned IP addresses IP1 and IP2 by a network node (e.g., a P-GW or an IP server).

At operation 1412, a direct radio connection may be established between the UE1 1400 and the UE2 1402.

At operation 1414, the UE1 1400 and the UE2 1402 may exchange each other's IP address if the UE1 1400 and the UE2 1402 were not communicating with each other prior to establishment of the direct radio connection with each other. The exchange of IP addresses may be performed via wireless protocol stack layers or via upper layers (e.g., application layer) in the UE1 1400 and the UE2 1402.

At operation 1416, the UE1 1400 and the UE2 1402 may perform data communication with each other using the IP addresses.

At operation 1418, the UE1 1400 and the UE2 1402 may mutually decide to switch the path from the direct communication path to the communication path via the wireless communication network. A method of making the decision is out of scope of the present disclosure, so a detailed description thereof will be omitted.

At operations 1422 and 1444, UE1 1400 and the UE2 1402 may then respectively create and activate ProSe EPS bearers thereof in the wireless communication network in operations. For example, at operation 1422, the UE 1400 may create and activate the ProSe EPS bearer thereof. As another example, at operation 1424, the UE 1402 may create and activate the ProSe EPS bearer thereof. If the ProSe EPS bearers are already created, the UE1 1400 and the UE2 1402 may only activate the ProSe EPS bearers. If the ProSe EPS bearers are already created and activated, then the UE1 1400 and the UE2 1402 may not perform operations 1422 and 1424.

According to various embodiments of the present disclosure, the ProSe EPS bearers to be created/activated may depend on whether the UE1 1400 and the UE2 1402 are having unidirectional or bidirectional communication with each other. According to various embodiments of the present disclosure, in case of unidirectional communication from the UE1 1400 to the UE2 1402, the UE1 1400 may create/ activate a UL ProSe EPS bearer, whereas the UE2 1402 may create/activate a DL ProSe EPS bearer. According to various embodiments of the present disclosure, in case of unidirectional communication from the UE2 1402 to the UE1 1400, the UE2 1402 may create/activate a UL ProSe EPS bearer, whereas the UE1 1400 may create/activate a DL ProSe EPS bearer. In case of bidirectional communication between the UE1 1400 and the UE2 1402, the UE1 1400 and the UE2 1402 may both create/activate a UL ProSe EPS bearer and a DL ProSe EPS bearer.

At operation 1426, once the ProSe EPS bearers are created/activated, the UE1 1400 and the UE2 1402 may provide information about the created/activated ProSe EPS bearers to each other.

Although the creation/activation of the ProSe EPS bearers and the exchange of information about the created/activated ProSe EPS bearers are assumed herein to be performed after the decision of the switching of the communication path at operation 1418 for convenience of description, it should be noted that operation 1420 (e.g., operations 1422, 1424 and 1426) may be performed any time before operation 1418.

At operation 1430, UE1 1400 and the UE2 1402 may then transmit switching indication to each other.

At operations 1432 and 1434, UE1 1400 and UE2 1402 may respectively start communication with each via the wireless communication network using the created/activated ProSe EPS bearers.

Figure 15:
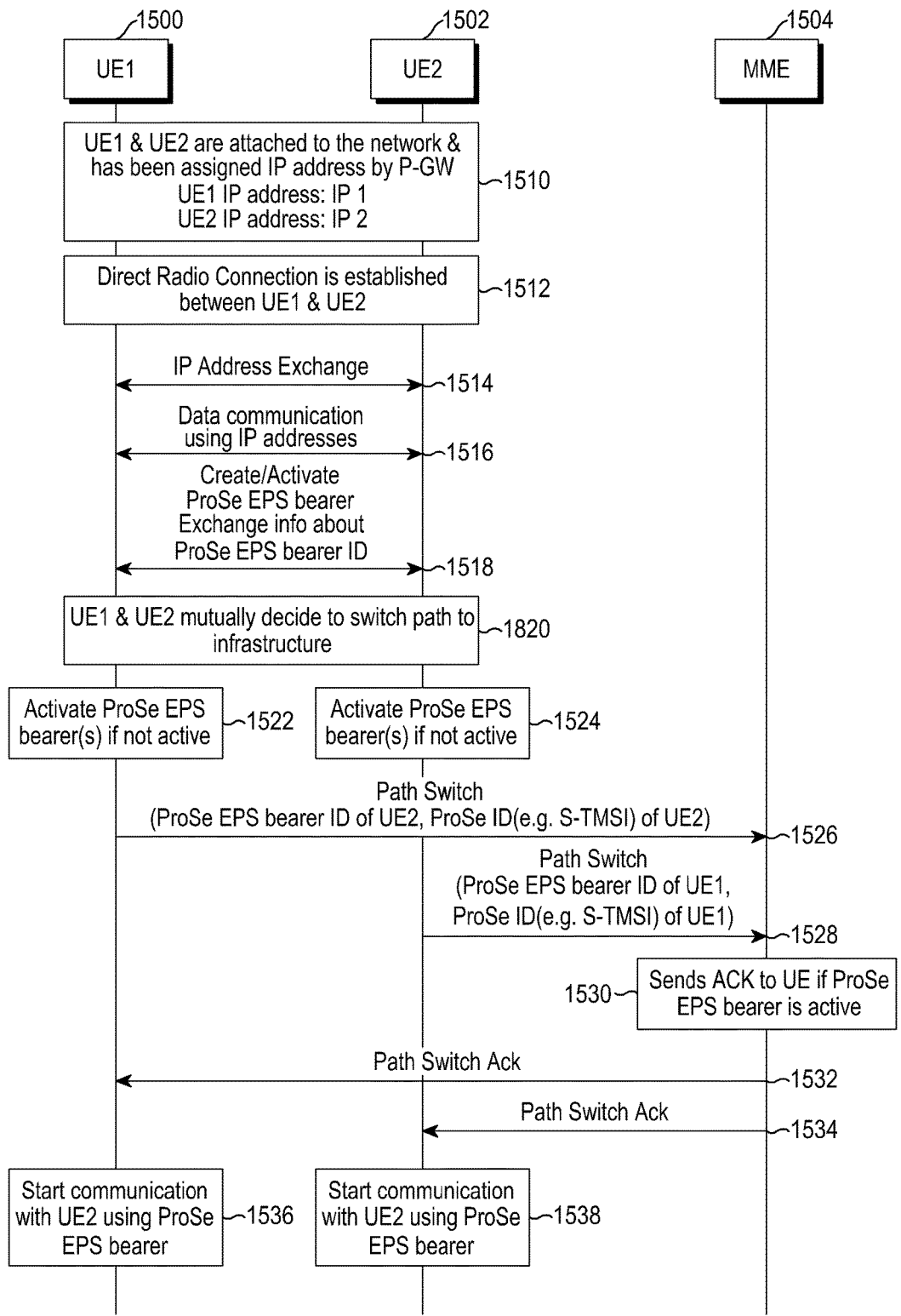
FIG. 15 illustrates a communication path switching method according to an embodiment of the present disclosure.

FIG. 15 illustrates a communication path switching method according to an embodiment of the present disclosure.

Referring to FIG. 15, a signaling flow for switching from a direct communication path to a communication path via the wireless communication network according to an embodiment of the present disclosure is provided.

A UE1 1500 and a UE2 1502 are attached to the wireless communication network. At operation 1510, the UE1 1500 and the UE2 1502 may be assigned IP addresses IP1 and IP12 by a network node (e.g., P-GW or IP server), respectively.

At operation 1512, a direct radio connection may be established between the UE1 1500 and the UE2 1502.

At operation 1514, the UE1 1500 and the UE2 1502 may exchange each other's IP address if the UE1 1500 and the UE2 1502 were not communicating with each other prior to establishment of the direct radio connection with each other. The exchange of IP addresses may be performed via wireless protocol stack layers or via upper layers (e.g., application layer) in the UE1 1500 and the UE2 1502.

At operation 1516, the UE1 1500 and the UE2 1502 may perform data communication with each other using the IP addresses.

At operation 1518, the UE1 1500 and the UE2 1502 may create and/or activate the ProSe EPS bearers and exchange ProSe EPS bearer IDs with each other in the wireless communication network. It should be noted that operation 1518 may be performed any time before operation 1516.

At operation 1520, the UE1 1500 and the UE2 1502 may mutually decide to switch the path from the direct communication path to a communication path via the wireless communication network. A method of making the decision is out of scope of the present disclosure, so a detailed description thereof will be omitted.

At operations 1522 and 1524, the UE1 1500 and the UE2 1502 may respectively activate appropriate ProSe EPS bearers thereof if the appropriate ProSe EPS bearers are not activated.

According to various embodiments of the present disclosure, the ProSe EPS bearers to be activated may depend on whether the UE1 1500 and the UE2 1502 are having unidirectional or bidirectional communication with each other. According to various embodiments of the present disclosure, in case of unidirectional communication from the UE1 1500 to the UE2 1502, the UE1 1500 may activate a UL ProSe EPS bearer whereas the UE2 1502 may activate a DL ProSe EPS bearer. According to various embodiments of the present disclosure, case of unidirectional communication from the UE2 1502 to the UE1 1500, the UE2 1502 may activate a UL ProSe EPS bearer whereas the UE1 1500 may activate a DL ProSe EPS bearer. According to various embodiments of the present disclosure, case of bidirectional communication between the UE1 1500 and the UE2 1502, the UE1 1500 and the UE2 1502 may both activate a UL ProSe EPS bearer and a DL ProSe EPS bearer.

At operation 1526, the UE1 1500 may then transmit a Path Switch message including ProSe EPS bearer ID(s) of the UE2 1502, to an MME 1504. The Path Switch message may further include a ProSe ID (an ID in the wireless communication network, e.g., SAE (System Architecture Evolution) Temporary Mobile Subscriber Identity (S-TMSI)) of the UE2 1502.

At operation 1528, the UE2 1502 may also transmit the Path Switch message including ProSe EPS bearer ID(s) of UE1 1500, to the MME 1504. The Path Switch message may further include a ProSe ID (e.g., S-TMSI) of the UE1 1500.

At operations 1532 and 1534, the MME 1504 may transmit a Path Switch Acknowledgement (ACK) to the UE1 1500 and the UE2 1502 if ProSe EPS bearers indicated by the Path Switch messages are activated.

At operations 1536 and 1538, after receiving the Path Switch ACK, the UE1 1500 and the UE2 1502 may respectively switch to the communication path via the wireless communication network, and may continue to respectively transmit IP packets to each other using the ProSe EPS bearers.

Figure 16A:
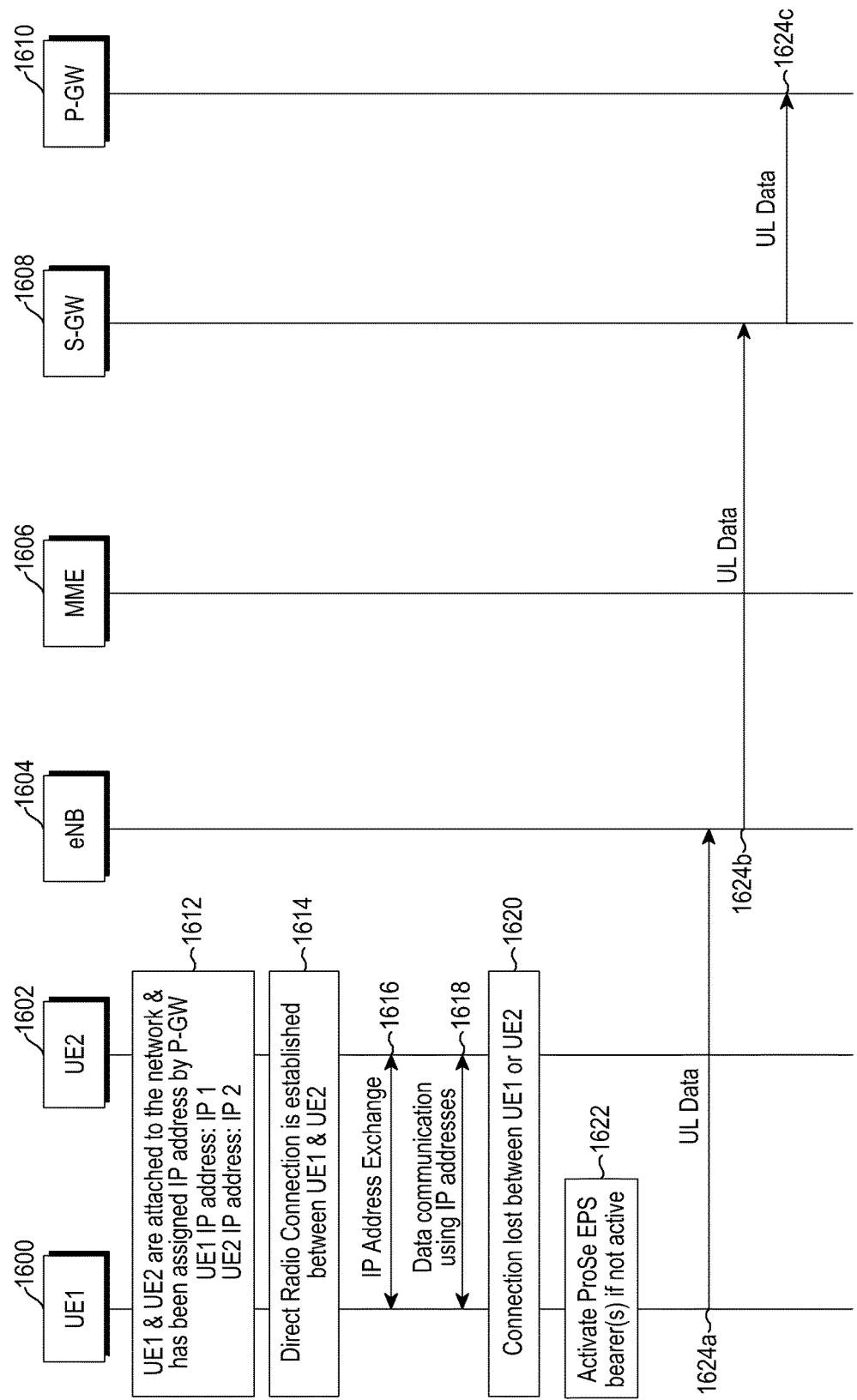
FIGS. 16A and 16B illustrate a communication path switching method according to an embodiment of the present disclosure.
Figure 16B:
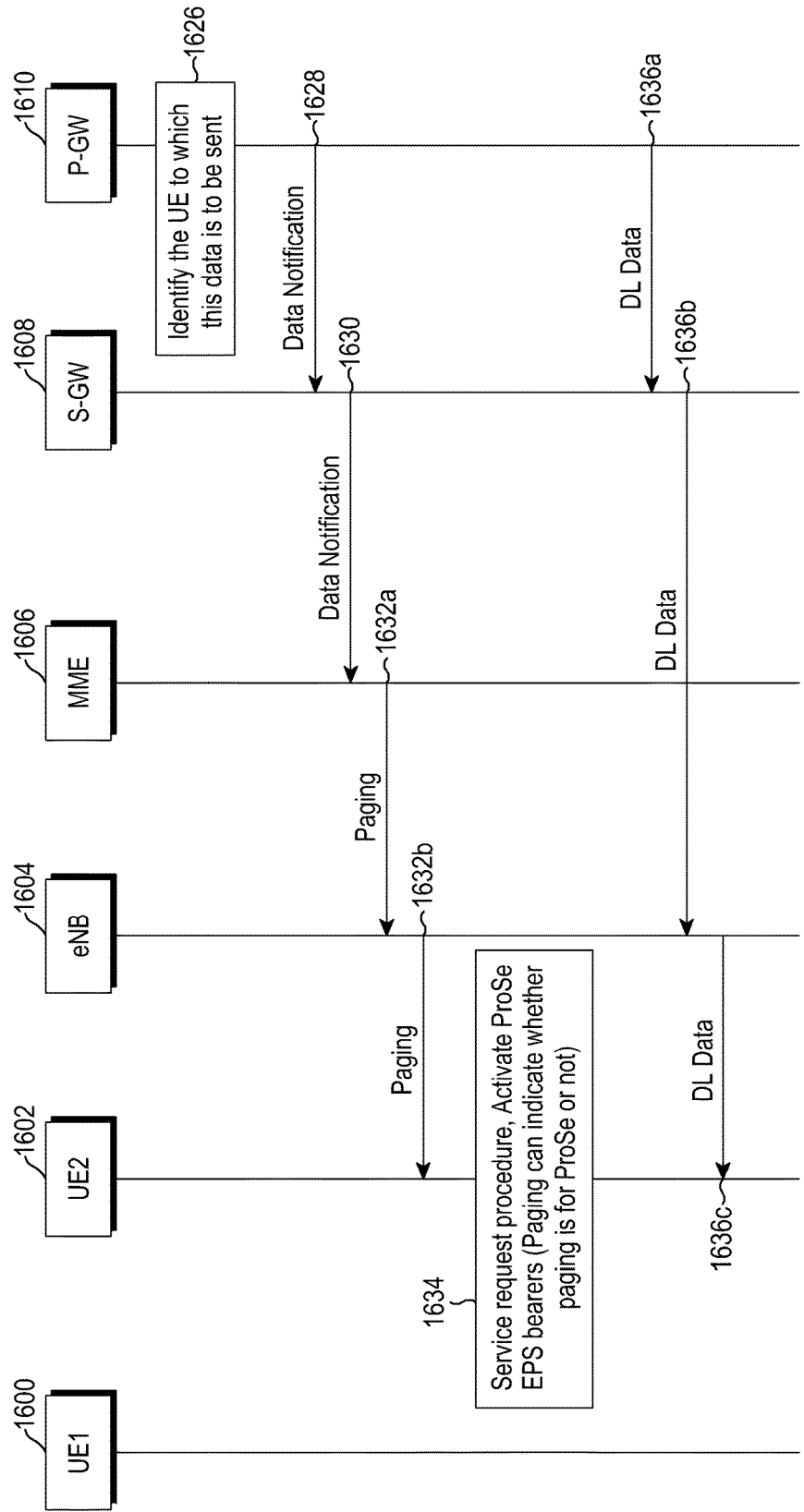

FIGS. 16A and 16B illustrate a communication path switching method according to another embodiment of the present disclosure.

Referring to FIGS. 16A and 16B, a signaling flow for switching from a direct communication path to a communication path via the wireless communication network according to various embodiments of the present disclosure is provided.

A UE1 1600 and a UE2 1602 are attached to the wireless communication network. At operation 1612, the UE1 1600 and the UE2 1602 may be respectively assigned IP addresses IP1 and IP2 by a network node (e.g., P-GW, IP server, and/or the like).

At operation 1614, a direct radio connection may be established between the UE1 1600 and the UE2 1602.

At operation 1616, the UE1 1600 and the UE2 1602 may exchange each other's IP address if the UE1 1600 and the UE2 1602 were not communicating with each other prior to establishment of the direct radio connection with each other. The exchange of IP addresses may be performed via the wireless protocol stack layers or via upper layers (e.g., application layer) in the UE1 1600 and the UE2 1602.

At operation 1618, the UE1 1600 and the UE2 1602 may perform data communication with each other using the IP addresses.

At operation 1620, the direct radio communication is lost between the UE1 1600 and the UE2 1602.

At operation 1622, the UE1 1600, which is transmitting a data packet to the UE2 1602, may activate the UL ProSe EPS bearer to transmit the data packets via the wireless communication network. The UE1 1600 may start transmitting the data packets via the wireless communication network. At operation 1622, the UE1 1600 may or may not activate the DL ProSe EPS bearer depending on whether the communication of the UE1 1600 is bidirectional communication or unidirectional communication.

At operation 1624, the UL data packet transmitted by the UE1 1600 may reach a P-GW 1610 via an eNB 1604 and an S-GW 1608. For example, at operation 1624a, the UE1 1600 may transmit the UL data packet to the eNB 1604. At operation 1624b, the eNB 1604 may transmit the UL data packet to the S-GW 1608. At operation 1624c, the S-GW 1608 may transmit the data packet to the P-GW 1610.

At operation 1626, upon receiving the UL data packets on the UL ProSe EPS bearer, the P-GW 1610 may determine a DL ProSe EPS bearer corresponding to the received UL data packets using a DL packet filter table.

At operation 1628, the P-GW 1610 may then transmit a data notification to the S-GW 1608 if the determined DL ProSe EPS bearer is not activated. The data notification may include at least one of a ProSe EPS bearer ID and an IMSI of the UE2 1602 to which the DL ProSe EPS bearer is created. For example, the DL ProSe EPS bearer may be first created at any time before operation 1628.

At operation 1630, the S-GW 1608 may transmit the data notification to the MME 1606. The data notification may include at least one of a ProSe EPS bearer ID and an IMSI of the UE2 1602 to which the DL ProSe EPS bearer is created.

At operation 1632, the MME 1606 may page the UE2 1602 in all eNBs 1604 of tracking areas at which the UE2 1602 is registered. For example, at operation 1632*a*, the MME 1606 may control an operation of paging the eNB 1604. At operation 1632*b*, the eNB 1604 may page the UE2 1602.

At operation 1634, upon receiving the paging message, the UE2 1602 may perform a service request procedure, and activate the DL ProSe EPS bearer. The paging message that the UE2 1602 has received may indicate whether the paging is for ProSe or not.

At operation 1636, the P-GW 1610 may transmit the data packets that the P-GW 1610 has received from the UE1 1600 on the UL ProSe EPS bearer, to the UE2 1602 on the activated DL ProSe EPS bearer. For example, at operation 1636*a*, the P-GW 1610 may transmit the data packets to the S-GW 1608. At operation 1636*b*, the S-GW 1608 may transmit the data packets to the eNB 1604. At operation 1636*c*, the eNB may transmit the data packets to the UE2 1602.

Until operations 1628, 1630, 1632 and 1634 are completed, the P-GW 1610 may buffer the UL data packets from the UE1 1600, or the P-GW 1610 may transmit the UL data packets from the UE1 1600 to the S-GW 1608 and the S-GW 1608 may buffer the UL data packets.

Figure 17A:
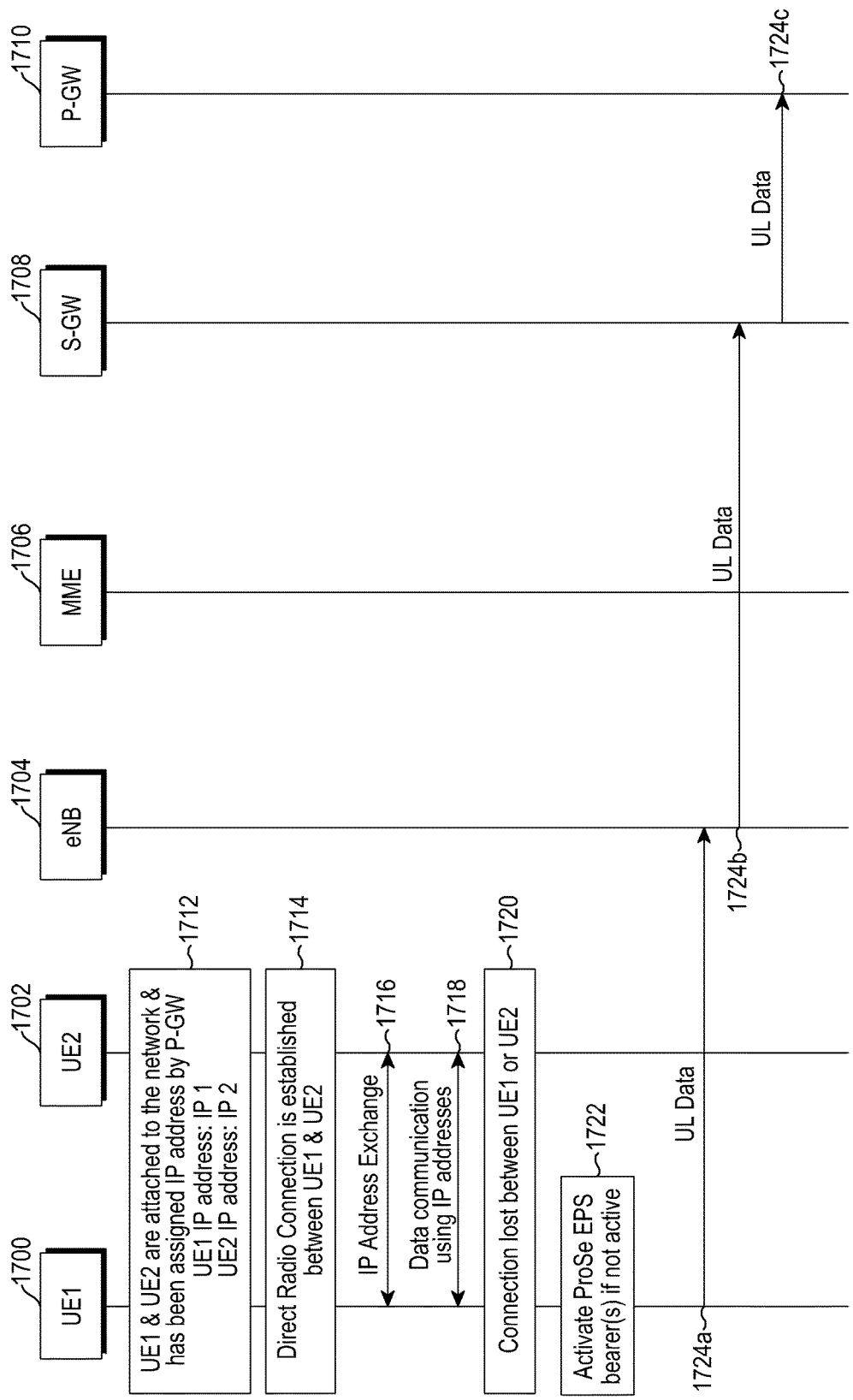
FIGS. 17A and 17B illustrate a communication path switching method according to an embodiment of the present disclosure.
Figure 17B:
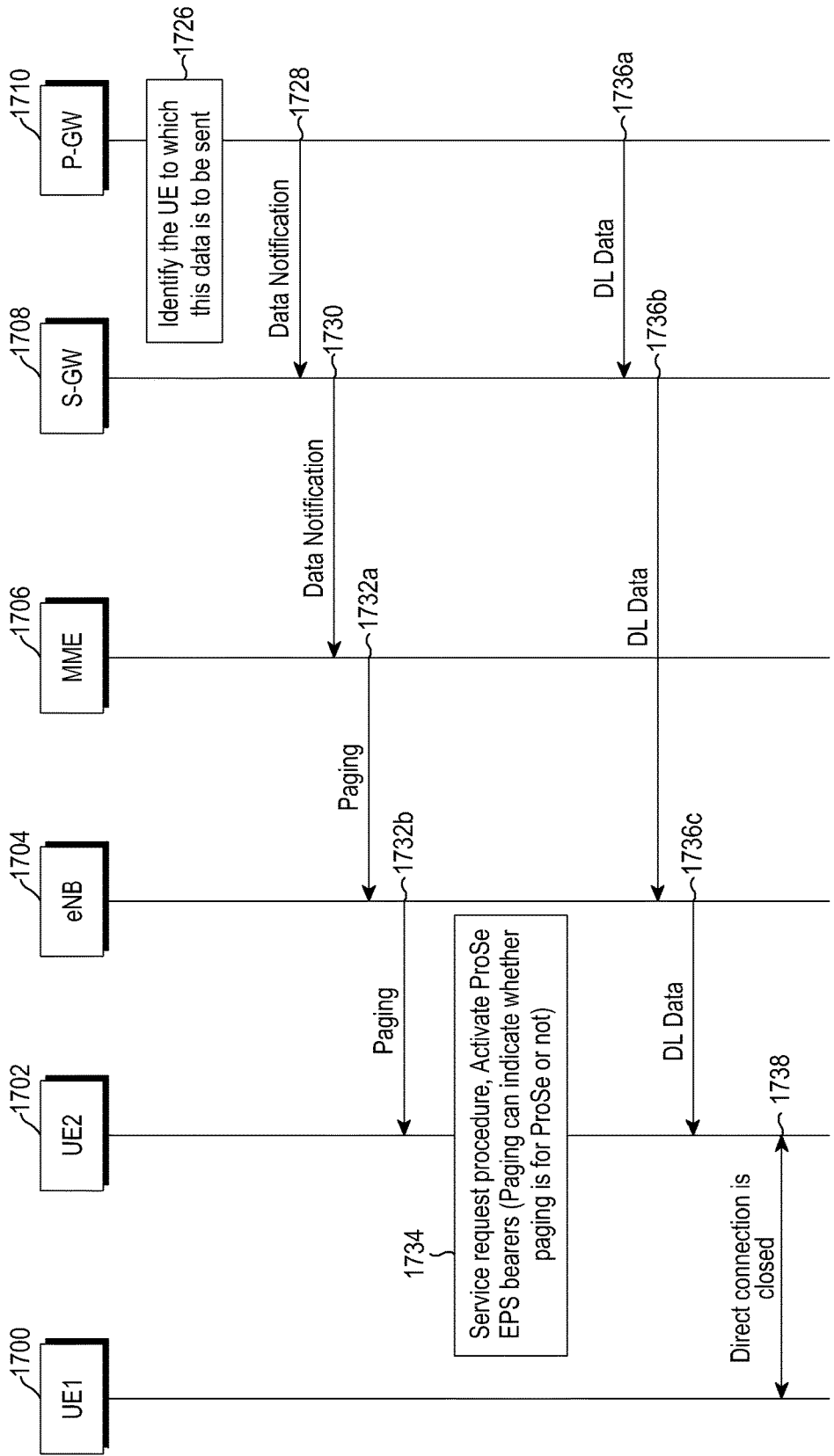

FIGS. 17A and 17B illustrate a communication path switching method according to an embodiment of the present disclosure.

Referring to FIGS. 17A and 17B, a signaling flow for switching from a direct communication path to a communication path via the wireless communication network according to various embodiments of the present disclosure is provided.

A UE1 1700 and a UE2 1702 are attached to the wireless communication network. At operation 1712, the UE1 1700 and the UE2 1702 may be respectively assigned IP addresses IP1 and IP2 by a network (e.g., P-GW or IP server).

At operation 1714, a direct radio connection may be established between the UE1 1700 and the UE2 1702.

At operation 1716, the UE1 1700 and the UE2 1702 may exchange each other's IP address if the UE1 1700 and the UE2 1702 were not communicating with each other prior to establishment of the direct radio connection with each other. The exchange of IP addresses may be performed via the wireless protocol stack layers or via upper layers (e.g., application layer) in the UE1 1700 and the UE2 1702.

At operation 1718, the UE1 1700 and the UE2 1702 may perform data communication with each other using the IP addresses.

At operation 1720, the connection quality of the direct radio connection between the UE1 1700 and the UE2 1702 may drop. For example, the connection between the UE1 1700 and the UE2 1702 may be lost.

The UE1 1700 and the UE2 1702 may continue to exchange data on the direct communication path (or the direct wireless connection). At operation 1722, in parallel, the UE1 1700, which is transmitting data packets to the UE2 1702, may activate the UL ProSe EPS bearer to transmit the data packets via the wireless communication network. In addition, the UE1 1700 may start transmitting the data packets via the wireless communication network. At operation 1722, the UE1 1700 may or may not activate the DL ProSe EPS bearer depending on whether the communication of the UE1 1700 is bidirectional communication or unidirectional communication.

At operation 1724, the UL data packets transmitted by the UE1 1700 may reach a P-GW 1710 via an eNB 1704 and an S-GW 1708. For example, at operation 1724*a*, the UE1 1700 transmits the data packets to the eNB 1704. At operation 1724*b*, the eNB 1704 transmits the data packets to the S-GW 1708. At operation 1724*c*, the S-GW 1708 transmits the data packets to the P-GW 1710.

At operation 1726, upon receiving the UL data packets on a UL ProSe EPS bearer, the P-GW 1710 may determine the DL ProSe EPS bearer corresponding to the received UL data packets using a DL packet filter table, in operation 1726.

At operation 1728, the P-GW 1710 may then transmit a data notification to the S-GW 1708 if the determined DL ProSe EPS bearer is not activated. The data notification may include at least one of a ProSe EPS bearer ID and an IMSI of the UE2 1702 to which the DL ProSe EPS bearer is created. For example, the DL ProSe EPS bearer may be first created at any time before operation 1728.

At operation 1730, the S-GW 1708 may transmit the data notification to an MME 1706. The data notification may include at least one of a ProSe EPS bearer ID and an IMSI of the UE2 1702 to which the DL ProSe EPS bearer is created.

At operation 1732, the MME 1706 may page the UE2 1702 in all eNBs 1704 of tracking areas where the UE2 1702 is registered. For example, at operation 1732*a*, the MME 1706 may control an operation of paging the eNB 1704. At operation 1732*b*, the eNB 1704 may page the UE2 1702.

At operation 1734, upon receiving the paging message, the UE2 1702 may perform a service request procedure, and activate the DL ProSe EPS bearer. The paging message that the UE2 1702 has received may indicate whether the paging is for ProSe or not.

At operation 1736, the P-GW 1710 may transmit the data packets that the P-GW 1710 has received from the UE1 1700 on the UL ProSe EPS bearer, to the UE2 1702 on the activated DL ProSe EPS bearer. For example, at operation 1736*a*, the P-GW 1710 may transmit the data packets to the S-GW 1708. At operation 1736*b*, the S-GW 1708 may transmit the data packets to the eNB 1704. At operation 1736*c*, the eNB 1704 may transmit the data packets to the UE2 1702.

Subsequently, at operation 1738, the UE2 1702 may then trigger and close the direct connection path between the UE1 1700 and the UE2 1702. During operations 1722 to 1734, the UE1 1700 and the UE2 1702 may continue to exchange data using the direct communication path.

Figure 18:
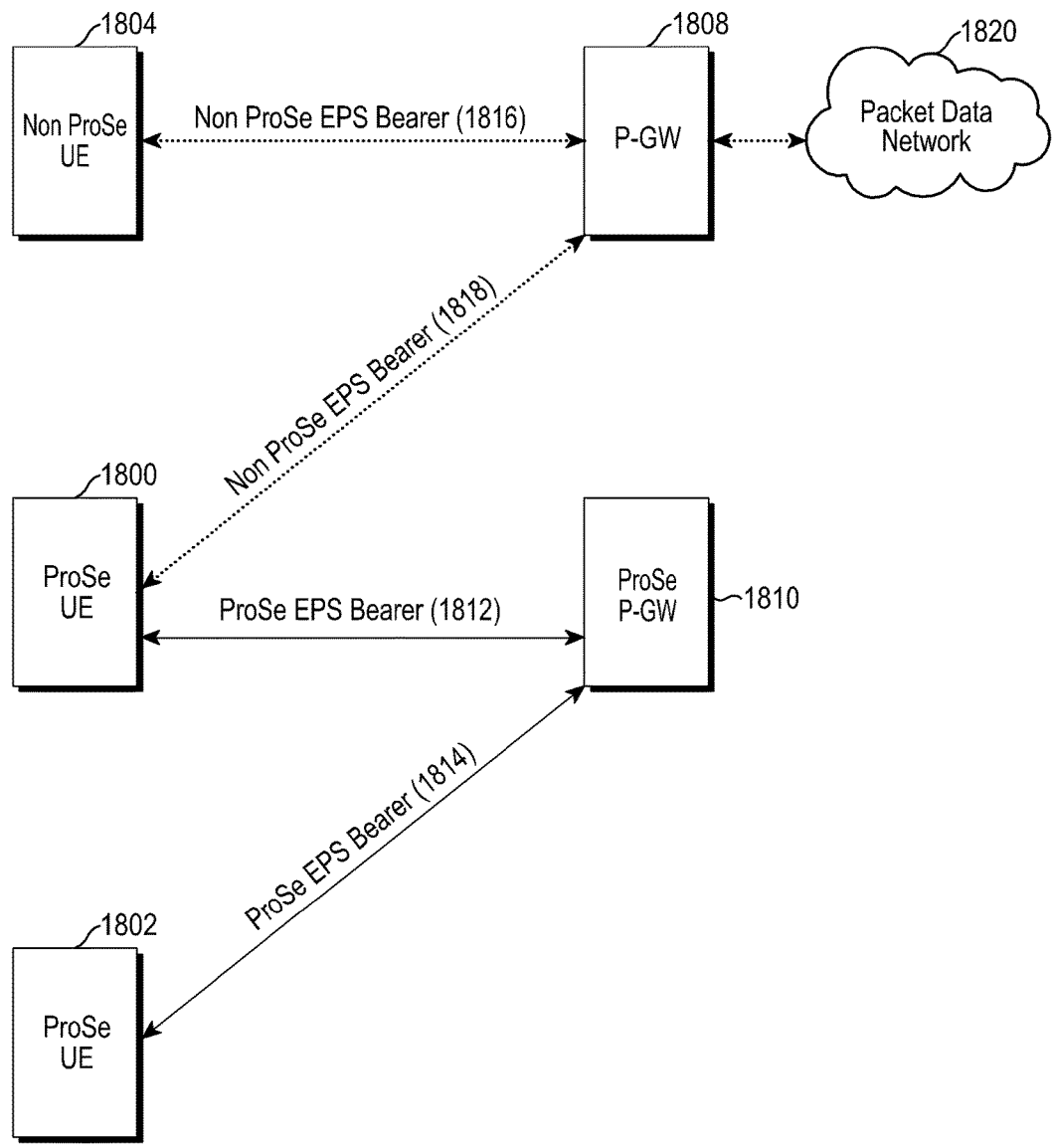
FIG. 18 illustrates a communication system including EPS bearers and a P-GW according to an embodiment of the present disclosure.

FIG. 18 illustrates a communication system including EPS bearers and a P-GW according to an embodiment of the present disclosure.

Referring to FIG. 18, the communication system includes ProSe UE 1800, ProSe UE 1802, a Non ProSe UE 1804, P-GW 1808, P-GW 1810. As illustrated in FIG. 18, EPS bearers (e.g., EPS bearer 1812, EPS bearer 1814, EPS bearer 1816 and EPS bearer 1818) may be established between the P-GWs and the UEs.

The ProSe UE 1800 is a UE that has the capability to directly communicate with another ProSe UE 1802. The ProSe UE 1800 may establish a Non ProSe EPS bearer 1818 to the P-GW 1808 to communicate with any IP entity in a PDN 1820, and may also establish a ProSe EPS bearer to the ProSe P-GW 1810 to communicate with another UE 1802. The ProSe UE 1800 may simultaneously use the ProSe EPS bearer 1812 and the Non ProSe EPS bearer 1818 to communicate simultaneously with the IP entity in the PDN 1820 and another ProSe UE 1802. The Non ProSe UE 1804 is a UE that does not have the capability to directly communicate with other UEs 1800 and 1802. Herein, the ProSe P-GW 1810 means a P-GW supporting establishment of ProSe EPS bearers.

One or more ProSe EPS bearers (e.g., ProSe EPS bearer 1812 and ProSe EPS bearer 1814) may be established between the ProSe UEs (e.g., ProSe EPS bearer 1800 and ProSe EPS bearer 1802) and the ProSe P-GW 1810. One and more Non ProSe EPS bearers (e.g., Non ProSe EPS bearer 1816 and Non ProSe EPS bearer 1818) may be established between the Non ProSe UE 1804 and the P-GW 1808, or between the ProSe UE 1800 and the P-GW 1808. In the UL or DL direction, the ProSe EPS bearers (e.g., ProSe EPS bearer 1812 and ProSe EPS bearer 1814) between the UEs (e.g., UE 1800 and UE 1802) and the ProSe P-GW 1810 may carry IP packets from the UEs (e.g., UE 1800 and UE 1802), which are destined to other UEs. In the UL direction, the Non ProSe EPS bearers (e.g., Non ProSe EPS bearer 1818 and Non ProSe EPS bearer 1816) between the UEs (e.g., UE 1800 and UE 1804) and the P-GW 1808 may carry IP packets from the UEs, which are destined to an IP entity in the PDN 1820. In the DL direction, the Non ProSe EPS bearers (e.g., Non ProSe EPS bearer 1818 and Non ProSe EPS bearer 1816) between the UEs (e.g., UE 1800 and UE 1804) and the P-GW 1808 may carry IP packets from the IP entity in the PDN 1820, which are destined to the UEs 1800 and 1804.

The ProSe P-GW 1810 may perform the flowing operation on the IP packets received from the UEs (e.g., UE 1800 and UE 1802) on the ProSe EPS bearers 1812 and 1814 in the UL direction.

The ProSe P-GW 1810 may not make any changes in source and destination IP addresses of the IP packets.

The ProSe P-GW 1810 may determine a DL ProSe EPS bearer on which the received IP packets on the UL ProSe EPS bearers (e.g., UL ProSe EPS bearer 1812 and UL ProSe EPS bearer 1814) need to be transmitted. In other words, the ProSe P-GW 1810 may maintain DL ProSe packet filters to determine the DL ProSe EPS bearer corresponding to the IP packet received on the UL ProSe EPS bearers (e.g., UL ProSe EPS bearer 1812 and UL ProSe EPS bearer 1814).

The ProSe P-GW 1810 may transmit the received IP packets on the UL ProSe EPS bearers (e.g., UL ProSe EPS bearer 1812 and UL ProSe EPS bearer 1814), on the determined DL ProSe EPS bearer, if the DL ProSe EPS bearer is activated. If the determined DL ProSe EPS bearer is not activated, the ProSe P-GW 1810 may trigger paging to the UE of the determined DL ProSe EPS bearer. The ProSe P-GW 1810 may buffer the received packets on the UL ProSe EPS bearer until the determined DL ProSe EPS bearer is activated.

The other procedures of DL/UL ProSe EPS bearer mapping, path switching methods, DL packet filter maintenance, and the like may be the same as those for the case when the ProSe EPS bearer terminates at the ProSe P-GW.

Figure 19A:
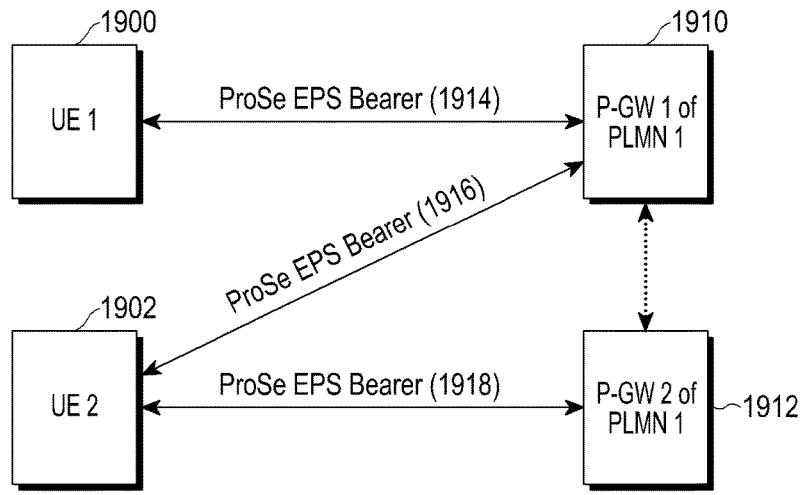
FIGS. 19A and 19B illustrate a method in which UEs communicate with each other via two or more P-GWs according to an embodiment of the present disclosure.
Figure 19B:
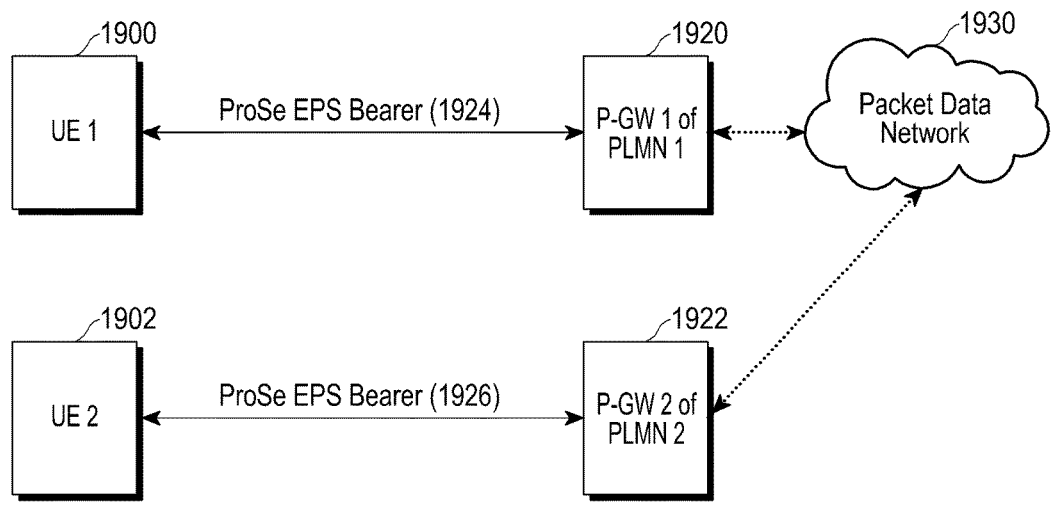

FIGS. 19A and 19B illustrate a method in which UEs communicate with each other via two or more P-GWs according to an embodiment of the present disclosure.

Referring to FIG. 19A, a case in which a UE1 1900 and a UE2 1902 respectively communicate via a P-GW1 1910 and a P-GW2 1912 belonging to the same network operator is provided. For example, it can be assumed that the network operator has a Public Land Mobile Network 1 (PLMN1) as its identifier.

If IP addresses are assigned to a UE by a P-GW, different sets of IP addresses may be allocated to P-GWs for assignment of IP addresses. If the IP addresses are assigned to the UE by an IP server, a different set of IP addresses may be maintained for each P-GW.

If the P-GW1 1910 receives UL IP packets on a UL ProSe EPS bearer 1914 from the UE1 1900, the P-GW1 1910 may check (e.g., determine) the destination IP address included in the UL IP packet to determine whether the destination IP address of the UL IP packet is assigned by the P-GW1 1910, or assigned by another P-GW (e.g., P-GW2 1912).

If the destination IP address of the UL IP packet is assigned by the P-GW1 1910, the P-GW1 1910 may map the UL IP packet to the DL ProSe EPS bearer 1916 that is established between the P-GW1 1910 and the UE2 1902, using the DL packet filters stored in the packet filter table.

If the destination IP address is not assigned by the P-GW1 1910, the P-GW1 1910 may forward the IP packet to the P-GW2 1912 which has assigned the destination IP address, allowing the P-GW2 1912 to map and transmit the forwarded IP packet on the DL ProSe EPS bearer 1918. In other words, if the P-GW2 1912 receives the IP packet of the UL ProSe EPS bearer 1914 from another P-GW1 1910, the P-GW2 1912 may perform the same operation as the operation that is performed when the IP packet is received on the UL ProSe EPS bearer created by the P-GW2 1912.

If the UE1 1900 and the UE2 1902 are respectively connected to the P-GW1 1910 and the P-GW2 1912, the UE1 1900 may transmit the IP packet on the UL ProSe EPS bearer 1914, the P-GW1 1910 may receive the IP packets on the UL ProSe EPS bearer 1914 and transmit the IP packets to the P-GW2 1912, and the P-GW2 1912 may then map the received IP packets to the DL ProSe EPS bearer 1918 of the UE2 1902 and transmit the received IP packets on the DL ProSe EPS bearer 1918 of the UE2 1902.

Referring to FIG. 19B, a case in which a UE1 1900 and a UE2 1902 respectively communicate via a P-GW1 1920 and a P-GW2 1922 belonging to different network operators is illustrated. For example, it can be assumed that the different network operators have a PLMN1 and a PLMN2 as identifiers thereof. The P-GW1 1920 belongs to the network operator with the PLMN1, and the P-GW2 1922 belongs to the network operator with the PLMN2.

IP addresses in different sets may be assigned to two or more PLMNs over a region wherein UEs are allowed to communicate with each other. In this case, a P-GW of one PLMN may route packets to a P-GW of another PLMN. Alternately, if UEs communicating with each other determine each other's IP address, the UEs may determine each other's PLMNs.

If the UE1 1900 and the UE2 1902 belong to different PLMNs (e.g., PLMN1 and PLMN2), respectively, then the UE1 1900 and the UE2 1902 may request wireless communication networks of PLMNs thereof to assign public IP addresses to the UE1 1900 and the UE2 1902. Each other's public IP address may be determined by the UEs (e.g., UE 1900 and UE 1902). During the communication with each other, the UEs 1900 and 1902 may use the public IP addresses in the IP packet.

The communication between the UEs (e.g., UE 1900 and UE 1902) using the public IP address may be performed over Non ProSe EPS bearers or ProSe EPS bearers. The communication between the UEs (e.g., UE 1900 and UE 1902) using the public IP address over the ProSe EPS bearers is as follows.

A UL IP packet on a UL ProSe EPS bearer 1924 between the UE1 1900 and the P-GW1 1920, which carries a public IP address of the UE1 1900 as a source IP address, may be treated differently from the IP packets carrying a local IP address of the UE1 1900 as a source IP address. The P-GW1 1920 knows whether the UE1 1900 has been assigned only a local IP address, only a public IP address, or both of a local IP address and a public IP address for the ProSe EPS bearer. A UL IP packet on the UL ProSe EPS bearer 1924 between the UE1 1900 and the P-GW2 1920, which carries a public IP address of the UE1 1900 as a source IP address may be transmitted to a PDN 1930. The UL IP packet transmitted to the PDN 1930 may be routed to the P-GW2 1922 to which the UE (e.g., UE2 1902) belongs, whose IP address is a destination IP address of the UL IP packet.

An IP packet on the UL ProSe EPS bearer 1924 between the UE1 1900 and the P-GW1 1920, which carries a local IP address of the UE1 1900 as a source IP address may be mapped to a DL ProSe EPS bearer, or transmitted to another P-GW if the destination IP address of the IP packet belongs to another P-GW.

Figure 20:
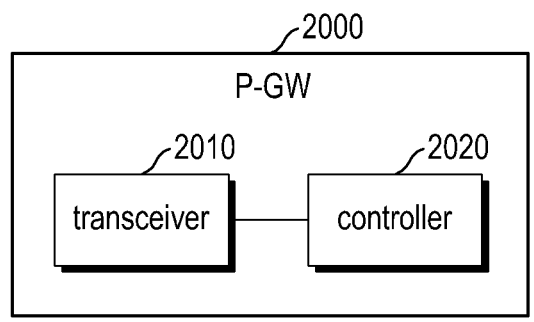
FIG. 20 illustrates a configuration of a P-GW apparatus according to an embodiment of the present disclosure.

FIG. 20 illustrates a configuration of a P-GW apparatus according to an embodiment of the present disclosure.

Referring to FIG. 20, a P-GW apparatus 2000 may include a transceiver 2010 for performing data communication with various network nodes, UEs, and entities in a PDN, and a controller 2020 for controlling the transceiver 2010. All operations of the P-GW, which have been described in the present disclosure, may be performed under control of the controller 2020.

Although the transceiver 2010 and the controller 2020 are illustrated as separate components in FIG. 20, the transceiver 2010 and the controller 2020 may be implemented as a single component.

Figure 21:
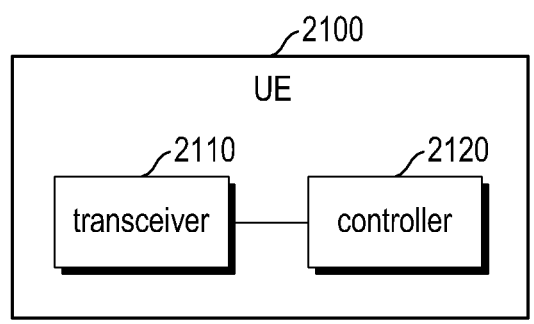
FIG. 21 illustrates a configuration of a UE apparatus according to an embodiment of the present disclosure.

FIG. 21 illustrates a configuration of a UE apparatus according to an embodiment of the present disclosure.

Referring to FIG. 21, a UE apparatus 2100 may include a transceiver 2110 for performing data communication with various network nodes and a P-GW, and a controller 2120 for controlling the transceiver 2110. All operations of the UE, which have been described in the present disclosure, may be performed under control of the controller 2120.

Although the transceiver 2110 and the controller 2120 are illustrated as separate components in FIG. 21, the transceiver 2110 and the controller 2120 may be implemented as a single component.

It should be noted that the schematic communication between UE layers, the configuration of IP packets, the packet filter tables, various EPS bearers created in a communication system including a UE(s) and a P-GW(s), the EPS bearer creation method, the communication path switching, and the configuration of the P-GW apparatus and the UE apparatus, which are illustrated in FIGS. 4A to 21, are not intended to limit the scope of the present disclosure. In other words, all of the PES bearers, the network nodes, the entities, the components or the operations described in FIGS. 4A to 21 should not be construed as necessary components for various embodiments of the present disclosure, and the present disclosure may be implemented with some of the components.

The above-described operations may be implemented by including a memory device storing the program code in any component in an entity, a function, an eNB, a P-GW or a UE of the communication system. A controller of the entity, the function, the eNB, the P-GW or the UE may perform the above-described operations by reading the program code stored in the memory device and executing the read program code by means of a processor or a Central Processing Unit (CPU).

Various components and modules of the entity, the function, the eNB, the P-GW or the UE described in the present disclosure may be operated using a hardware circuit (e.g., Complementary Metal Oxide Semiconductor (CMOS)-based logic circuit), firmware, software and/or a combination of hardware, firmware and/or software inserted in a machine-readable medium. For example, various electrical structures and methods may be implemented using transistors, logic gates, and electronic circuits such as Application-Specific Integrated Circuits (ASICs).

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for performing, by a first user equipment (UE), device-to-device (D2D) communication using a wireless communication network that includes an evolved node B (eNB), a serving gateway (S-GW), a packet data network (PDN) gateway (P-GW), and a PDN, the method comprising:

performing D2D communication with a second UE via a direct communication path using an allocated internet protocol (IP) address;

while performing the D2D communication via the direct communication path, establishing a first evolved packet system (EPS) bearer between the first UE and the P-GW, the first EPS bearer being configured to support D2D communication via the wireless communication network;

determining to switch from the D2D communication via the direct communication path to D2D communication via the wireless communication network;

in response to the determining, communicating a first IP packet through the first EPS bearer using D2D communication via the wireless communication network; and while performing the D2D communication via the direct communication path, establishing a second EPS bearer between the first UE and the P-GW, the second EPS bearer being configured to support D2D communication via the wireless communication network, wherein the first EPS bearer is used for D2D communication with the second UE, and the second EPS bearer is used for D2D communication with a third UE different from the second UE, and wherein the first IP packet that is transmitted through the first EPS bearer, which is established to the P-GW, is not transmitted to the PDN, or the first IP packet that is received through the first EPS bearer, which is established to the P-GW, is not received from the PDN.

2. The method of claim 1, wherein the first IP packet that is not transmitted to the PDN is transmitted to the second UE on a third EPS bearer that the P-GW has established to the second UE, or the first IP packet that is not received from the PDN is received from the second UE on the third EPS bearer that the P-GW has established to the second UE.

3. The method of claim 1, further comprising establishing, to the P-GW, a fourth EPS bearer for communicating a second IP packet to/from the PDN via the wireless communication network while maintaining the first EPS bearer.

4. The method of claim 1, further comprising:
establishing, to the P-GW, a fifth EPS bearer supporting D2D communication via the wireless communication network while maintaining the first EPS bearer,
wherein the first UE provides differential quality of service (QoS) across the first EPS bearer and the fifth EPS bearer.

5. The method of claim 1, further comprising:
receiving a paging message from the eNB if the first EPS bearer is not activated; and
activating the first EPS bearer based at least in part on the paging message.

6. The method of claim 1, wherein the determination to switch from the direct communication path to the D2D communication via the wireless communication network is based at least in part on channel conditions.

7. A non-transitory computer-readable storage medium storing instructions that, when executed, cause at least one processor to perform the method of claim 1.

8. A method for supporting, by a packet data network (PDN) gateway (P-GW), device-to-device (D2D) communication using a wireless communication network that includes an evolved node B (eNB), a serving gateway (S-GW), the P-GW, and a PDN, the method comprising:
establishing, by the P-GW, a first evolved packet system (EPS) bearer to a first user equipment (UE) and a second EPS bearer to a second UE, the first EPS bearer and the second EPS bearer being configured to support D2D communication via the wireless communication network between the first UE and the second UE;
storing, by the P-GW, in a table, a packet filter including an identifier (ID) of the second EPS bearer and at least one of a source internet protocol (IP) address of the D2D communication or a destination IP address of the D2D communication;
upon the P-GW receiving a first IP packet from the first UE on the first EPS bearer using the D2D communication via the wireless communication network, mapping, by the P-GW, the received first IP packet to the second EPS bearer using the table;
transmitting, by the P-GW, the received first IP packet on the second EPS bearer;

establishing, by the P-GW, a third EPS bearer to the first UE and a fourth EPS bearer to a third UE; and
upon the P-GW receiving a second IP packet from the first UE on the third EPS bearer using the D2D communication via the wireless communication network, mapping, by the P-GW, the received second IP packet to the fourth EPS bearer using the table,
wherein the first EPS bearer and the second EPS bearer are established while the first UE and the second UE perform D2D communication via a direct communication path.

9. The method of claim 8, further comprising:
establishing, to the first UE, a fifth EPS bearer for communicating a third IP packet to/from the PDN via the wireless communication network while maintaining the first EPS bearer; and
upon receiving the third IP packet on the fifth EPS bearer, converting a source IP address of the third IP packet into a public IP address.

10. The method of claim 8, further comprising triggering activation of the second EPS bearer if the second EPS bearer is not activated.

11. The method of claim 8, further comprising:
establishing, to the first UE, a sixth EPS bearer supporting D2D communication via the wireless communication network while maintaining the first EPS bearer,
wherein the P-GW provides differential quality of service (QoS) to the first UE using the first EPS bearer and the sixth EPS bearer.

12. The method of claim 8, wherein the packet filter further includes at least one of a source port number or a destination port number of the D2D communication.

13. A non-transitory computer-readable storage medium storing instructions that, when executed, cause at least one processor to perform the method of claim 8.

14. A first user equipment (UE) apparatus for performing device-to-device (D2D) communication using a wireless communication network that includes an evolved node B (eNB), a serving gateway (S-GW), a packet data network (PDN) gateway (P-GW), and a PDN, the first UE apparatus comprising:
a transceiver configured to perform D2D communication with a second UE via a direct communication path using an allocated internet protocol (IP) address; and
at least one processor configured to:
while controlling the transceiver to perform the D2D communication via the direct communication path, control to establish a first evolved packet system (EPS) bearer between the first UE and the P-GW, the first EPS bearer being configured to support D2D communication via the wireless communication network,
determine whether to switch from the D2D communication via the direct communication path to D2D communication via the wireless communication network,
activate the first EPS bearer based on the determination,
in response to the activating of the first EPS bearer, communicate a first IP packet through the activated first EPS bearer using D2D communication via the wireless communication network,
while performing the D2D communication via the direct communication path, establish a second EPS bearer between the first UE and the P-GW, the second EPS bearer being configured to support D2D communication via the wireless communication network, wherein the first EPS bearer is used for D2D communication with the second UE, and the second EPS bearer is used for D2D communication with a third UE different from the second UE, and wherein the first IP packet that is transmitted through the first EPS bearer, which is established to the P-GW, is not transmitted to the PDN, or the first IP packet that is received through the first EPS bearer, which is established to the P-GW, is not received from the PDN.

15. The first UE apparatus of claim 14, wherein the first IP packet that is not transmitted to the PDN is transmitted to the second UE on a third EPS bearer that the P-GW has established to the second UE, or the first IP packet that is not received from the PDN is received from the second UE on the third EPS bearer that the P-GW has established to the second UE.

16. The first UE apparatus of claim 14, wherein the at least one processor is further configured to establish, to the P-GW, a fourth EPS bearer for communicating a second IP packet to/from the PDN via the wireless communication network while maintaining the first EPS bearer.

17. The first UE apparatus of claim 14,
wherein the at least one processor is further configured to establish, to the P-GW, a fifth EPS bearer supporting D2D communication via the wireless communication network while maintaining the first EPS bearer, and
wherein the first UE provides differential quality of service (QoS) across the first EPS bearer and the fifth EPS bearer.

18. The first UE apparatus of claim 14, wherein the at least one processor is further configured to:
receive a paging message from the eNB if the first EPS bearer is not activated, and
activate the first EPS bearer based at least in part on the paging message.

19. The first UE apparatus of claim 14, wherein the determination to switch from the direct communication path to the D2D communication via the wireless communication network is based at least in part on channel conditions.

20. A packet data network (PDN) gateway (P-GW) apparatus for supporting device-to-device (D2D) communication using a wireless communication network that includes an evolved node B (eNB), a serving gateway (S-GW), a P-GW, and a PDN, the P-GW apparatus comprising:
at least one processor configured to:
establish a first evolved packet system (EPS) bearer to a first user equipment (UE) and a second EPS bearer to a second UE, the first and second EPS bearers being configured to support D2D communication via the wireless communication network between the first UE and the second UE, and
store, in a table, a packet filter including an identifier (ID) of the second EPS bearer and at least one of a source internet protocol (IP) address of the D2D communication or a destination IP address of the D2D communication; and
a transceiver configured to communicate a first IP packet to/from at least one of the first UE or the second UE under control of the at least one processor,
wherein, upon the P-GW receiving the first IP packet from the first UE on the first EPS bearer using the D2D communication via the wireless communication network, the at least one processor is further configured to:
map the received first IP packet to the second EPS bearer using the table, and
transmit the first IP packet on the second EPS bearer,
wherein the at least one processor is further configured to:
establish a third EPS bearer to the first UE and a fourth EPS bearer to a third UE, and
upon the P-GW receiving a second IP packet from the first UE on the third EPS bearer using the D2D communication via the wireless communication network, map the received second IP packet to the fourth EPS bearer using the table, and
wherein the first EPS bearer and the second EPS bearer are established while the first UE and the second UE perform D2D communication via a direct communication path.

21. The P-GW apparatus of claim 20, wherein the at least one processor is further configured to:
establish, to the first UE, a fifth EPS bearer for communicating a third IP packet to/from the PDN via the wireless communication network while maintaining the first EPS bearer, and
upon receiving the third IP packet on the fifth EPS bearer, convert a source IP address of the third IP packet into a public IP address.

22. The P-GW apparatus of claim 20, wherein the at least one processor is further configured to trigger activation of the second EPS bearer if the second EPS bearer is not activated.

23. The P-GW apparatus of claim 20,
wherein the at least one processor is further configured to establish, to the first UE, a sixth EPS bearer supporting D2D communication via the wireless communication network while maintaining the first EPS bearer, and
wherein the P-GW provides differential quality of service (QoS) to the first UE using the first EPS bearer and the sixth EPS bearer.

24. The P-GW apparatus of claim 20, wherein the packet filter further includes at least one of a source port number or a destination port number of the D2D communication.

* * * * *